(12) United States Patent
Smrha et al.

(10) Patent No.: US 8,179,684 B2
(45) Date of Patent: May 15, 2012

(54) SLIDING ADAPTER PANEL WITH LIVING HINGE AND FORWARD/REARWARD LOCKING

(75) Inventors: Mark Smrha, Burnsville, MN (US); Thomas C Tinucci, Chaska, MN (US); Chad James Sjodin, Savage, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 854 days.

(21) Appl. No.: 12/287,271

(22) Filed: Oct. 7, 2008

(65) Prior Publication Data

US 2009/0129033 A1 May 21, 2009

Related U.S. Application Data

(60) Provisional application No. 60/983,425, filed on Oct. 29, 2007.

(51) Int. Cl.
*H05K 5/00* (2006.01)
*A47B 81/00* (2006.01)

(52) U.S. Cl. ........ 361/756; 361/752; 361/753; 361/754; 361/759; 361/679.57; 361/679.58; 312/223.2; 312/223.3

(58) Field of Classification Search .......... 361/724–727, 361/749–759, 679.57, 679.58; 312/223.1, 312/223.2, 223.3; 248/298.1, 274.1, 122.1
See application file for complete search history.

(56) References Cited

U.S. PATENT DOCUMENTS

| 4,765,710 | A | 8/1988 | Burmeister et al. |
| 5,129,030 | A | 7/1992 | Petrunia |
| 5,167,001 | A | 11/1992 | Debortoli et al. |
| 5,497,444 | A | 3/1996 | Wheeler |
| 5,717,810 | A | 2/1998 | Wheeler |
| 5,758,003 | A | 5/1998 | Wheeler et al. |
| 5,826,922 | A * | 10/1998 | Wernig .......................... 292/39 |
| 5,945,633 | A | 8/1999 | Ott et al. |
| 6,252,514 | B1 * | 6/2001 | Nolan et al. ............... 340/686.4 |
| 6,424,781 | B1 | 7/2002 | Puetz et al. |
| 6,504,988 | B1 | 1/2003 | Trebesch et al. |
| 6,591,051 | B2 | 7/2003 | Tolheid et al. |
| 6,715,619 | B2 | 4/2004 | Kim et al. |
| 6,760,531 | B1 | 7/2004 | Solheid et al. |
| 6,804,447 | B2 | 10/2004 | Smith et al. |
| 6,908,342 | B2 * | 6/2005 | Shimada ...................... 439/630 |
| 6,920,274 | B2 | 7/2005 | Rapp et al. |

(Continued)

FOREIGN PATENT DOCUMENTS

| EP | 0 341 027 A2 | 11/1989 |
| EP | 1 603 345 A2 | 12/2005 |
| WO | WO 2005/051006 A1 | 6/2005 |

OTHER PUBLICATIONS

Drawing of ADC Telecommunications Drawer, 1 page; Aug. 2006.

(Continued)

*Primary Examiner* — Robert J Hoffberg
*Assistant Examiner* — Jerry Wu
(74) *Attorney, Agent, or Firm* — Merchant & Gould P.C.

(57) ABSTRACT

An adapter panel including a chassis and a plurality of sliding adapter packs that define a front adapter field of the adapter panel. The sliding adapter packs includes a frame assembly having a living hinge and a lever arm. The living hinge locks the sliding adapter packs into both a forward and a rearward position. The living hinge is activated by either pulling or pushing the lever arm.

19 Claims, 23 Drawing Sheets

U.S. PATENT DOCUMENTS

| | | |
|---|---|---|
| 6,937,807 B2 | 8/2005 | Franklin et al. |
| 6,944,383 B1 | 9/2005 | Herzog et al. |
| 7,194,181 B2 | 3/2007 | Holmberg et al. |
| 7,200,316 B2 | 4/2007 | Giraud et al. |
| 7,474,828 B2 | 1/2009 | Leon et al. |
| 2003/0174996 A1 | 9/2003 | Henschel et al. |
| 2003/0223723 A1 | 12/2003 | Massey et al. |
| 2004/0062002 A1* | 4/2004 | Barringer et al. ............. 361/687 |
| 2004/0086252 A1 | 5/2004 | Smith et al. |
| 2008/0175551 A1* | 7/2008 | Smrha et al. .................. 385/135 |
| 2008/0175552 A1 | 7/2008 | Smrha et al. |

OTHER PUBLICATIONS

Drawing of ADC Telecommunications Drawer, 2 pages, Nov. 2006.

Corning Cable Systems; *Jumper Routing Procedure for Enhanced Management Frame*; dated Apr. 2002; 4 pgs.

ADC Telecommunications *Fiber Panel Products*, Second Edition, 6 pgs.; Jul. 1996.

ADC Telecommunications *Fiber Outside Plant Systems*, 4 pgs.; Aug. 1998.

\* cited by examiner

SLIDING ADAPTER PANEL WITH LIVING HINGE AND FORWARD/REARWARD LOCKING

CROSS-REFERENCE TO RELATED APPLICATIONS

This application claims the benefit of U.S. Provisional Application Ser. No. 60/983,425, filed Oct. 29, 2007; which application is incorporated herein by reference.

FIELD OF THE INVENTION

This disclosure relates to devices for use in the telecommunications industry, and associated methods. More specifically, this disclosure relates to a termination panel for use in the telecommunications industry, and methods associated with termination panels.

BACKGROUND OF THE INVENTION

Many local area networks and telecommunication systems utilize termination panels to provide cross-connections between telecommunications equipment. Demand for greater telecommunication services has prompted the increase in circuit densities of termination panels. Notwithstanding the advances made in the art, there is a continuous need for further improvement of high-density termination panels and associated methods. Improvements are needed, for example, to enhance termination access, cable management, and ease of cable termination associated with installation, maintenance, repair, upgrade, and/or cross-connection procedures.

SUMMARY OF THE INVENTION

The present disclosure relates to an adapter panel arrangement including a chassis and a plurality of sliding adapter packs. The adapter packs each include a hinging member that locks the sliding adapter pack into both a forward position and a rearward position to assist in cable termination procedures, for example. Each adapter pack also includes a handle that activates the hinging member to allow sliding movement between the forward and rearward positions.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
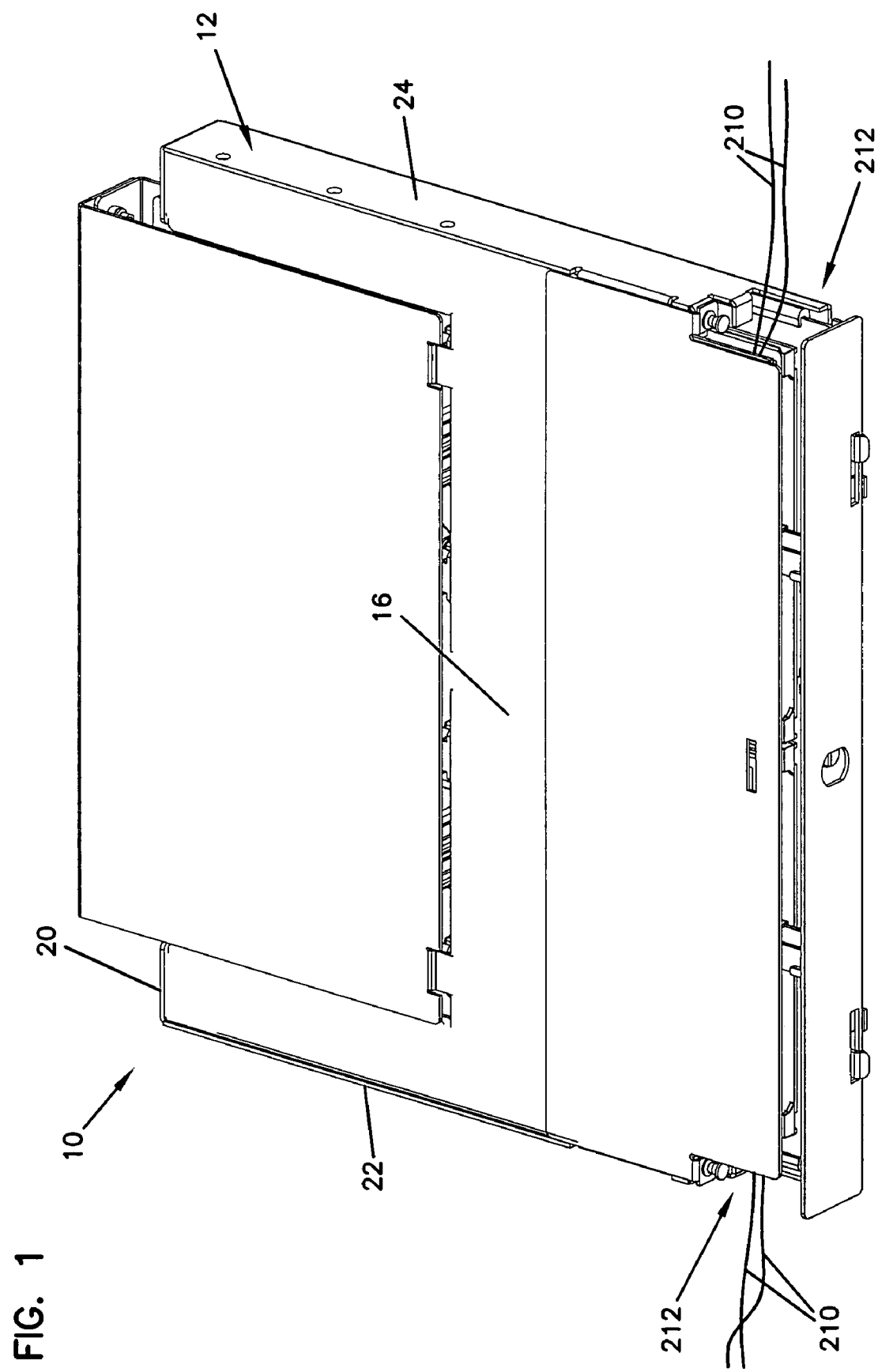
FIG. 1 is a top perspective view of one embodiment of an adapter panel, in accordance with the principles disclosed, and shown with a closed front cover.
Figure 2:
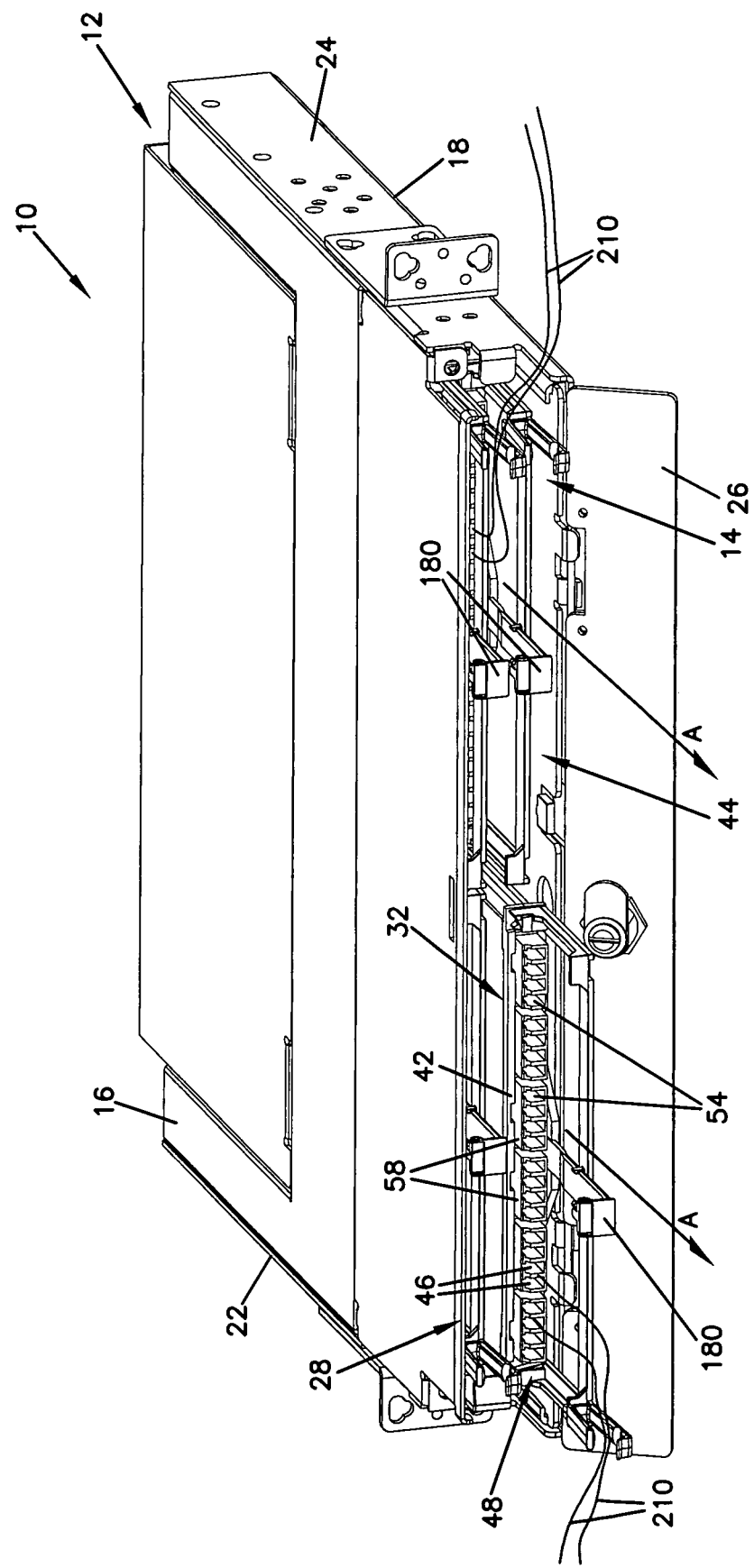
FIG. 2 is a front perspective view of the adapter panel of FIG. 1, shown with an open front cover.

FIGS. 1 and 2 illustrate an adapter panel (e.g., arrangement or assembly) 10 in accordance with the principles disclosed. The adapter panel 10 is designed to provide a high density of cable terminations, yet facilitate access to the cable terminations during installation and post-installation procedures.

The adapter panel 10 of the present disclosure generally includes a chassis 12 having an interior 14. The interior 14 is defined by a top wall 16, a bottom wall 18, a rear wall 20, and side walls 22, 24. A front adapter field 44 is located within the interior 14 of the chassis 12. Access to the interior 14 and the front adapter field 44 is provided through a front opening 28 in the chassis. The adapter panel 10 also includes a sliding drawer 34 (FIG. 4) that slides between an open position (FIG. 4) and a closed position (FIG. 2). A front cover 26 is attached to the sliding drawer 34. When the drawer 34 is in the closed position (FIG. 2), the front adapter field 44 is accessed through the front opening 28 when the front cover 26 is opened (FIG. 2); similarly, the front adapter field 44 is enclosed within the chassis 12 (FIG. 1) when the front cover 26 is closed.

Figure 4:
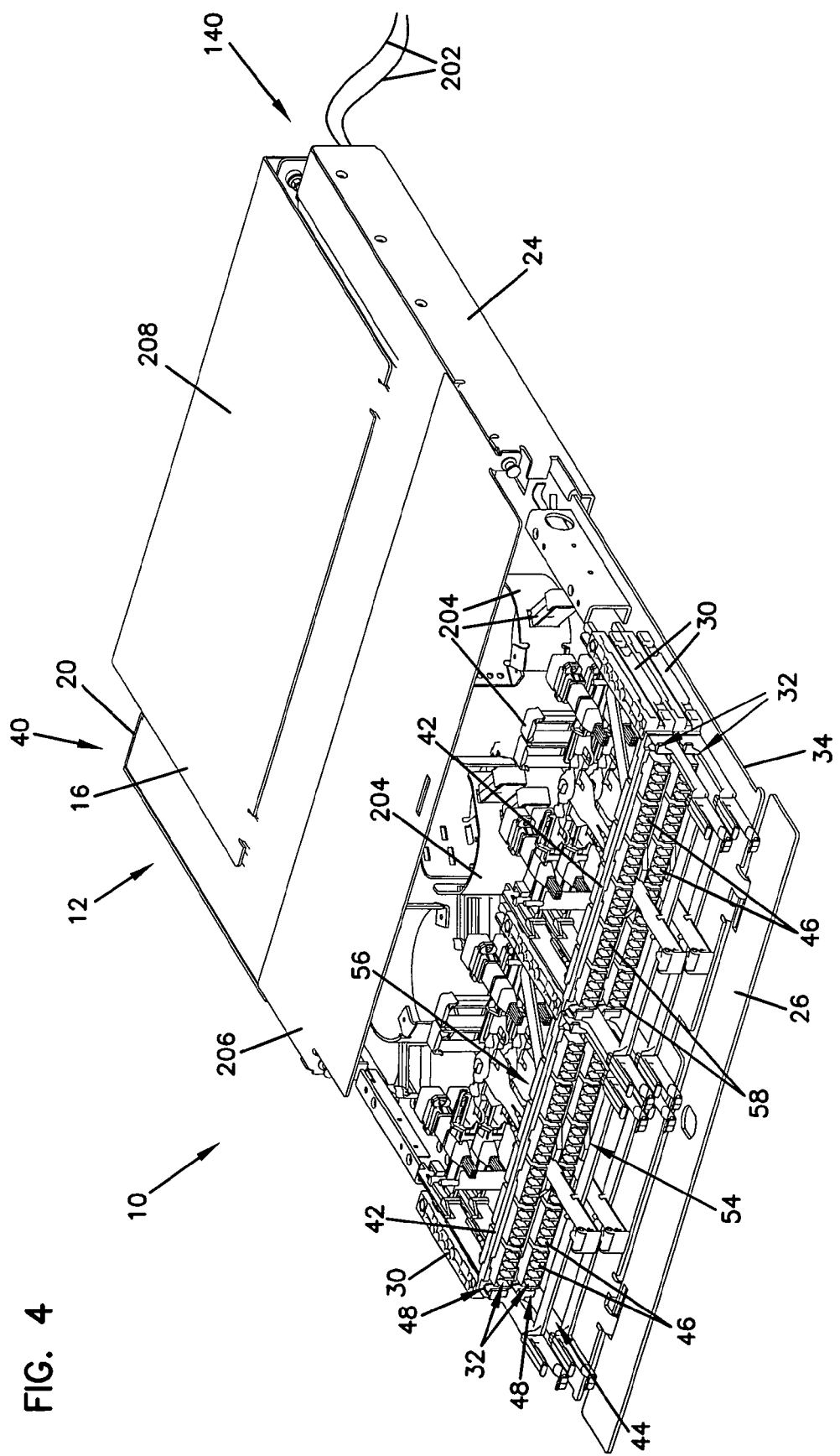
FIG. 4 is a front perspective view of the adapter panel of FIG. 2, shown with a drawer in an open position.

Referring now to FIG. 4, the adapter panel 10 includes a number of mounting guides 30 that are located within the interior 14 of the chassis 12 during operative use. As will be described in greater detail hereinafter, operative use is use after the initial installation and assembly of the adapter panel. The mounting guides 30 are attached or mounted to the drawer 34. A plurality of sliding adapter packs 32 (e.g., sliding panel segments, assemblies, or modules) is mounted to the mounting guides 30.

The drawer 34 is designed to slide outward from the chassis 12 primarily for installation purposes. In particular, the drawer 34 slides out from the chassis 12 to the open position (FIG. 4) during installation or assembly of the adapter panel, but is positioned in the closed position (FIG. 2) during operative use of the adapter panel 10. During operative use, the mounting guides 30 and the sliding adapter packs 32 are located within the interior 14 of the chassis 12 and the drawer 34 is in the closed position. A user accesses the adapter packs 32 from the front opening 28 of the chassis 12 without sliding the drawer 34 forward. In particular, the adapter packs 32 each slide outward from the interior 14 of the chassis independent of the drawer 34.

Referring now to FIGS. 2 and 4, each of the adapter packs 32 defines an individual face panel 42. Adapters 46 are mounted within openings 87 (FIG. 11) formed in the face panel 42. The individual face panels 42 of the adapter packs 32 define the front adapter field 44 of the adapter panel 10.

In the illustrated embodiment, the adapters 46 are fiber optic LC type adapters; however, other types of adapters, such as SC, ST, FC and MPO type adapters can also be used in accordance with the principles disclosed. Still other types of adapters or connectors for other fiber optic or copper applications can be used. Further, in the illustrated embodiment, the adapters 46 are blocked or grouped; each adapter block 58 including four adapters 46 (two adapter pairs). Other numbers of adapters can be provided in an adapter block, such as eight adapters (four adapter pairs) in one block, for example; the openings in the face panel 42 being correspondingly sized to receive the eight-adapter blocks. Alternatively, single adapters can be used and mounted within openings sized to receive the single adapters.

The adapters 46 of the face panel 42 are arranged in a row that defines an adapter array 48. What is meant by a row is that the adapters 46 are generally horizontally aligned with one another, as opposed to being arranged in a column (i.e., vertically aligned with one another). While each individual face panel 42 has only one row, in an alternative embodiment, each face panel 42 may include an array having a plurality of adapter rows.

Figure 5:
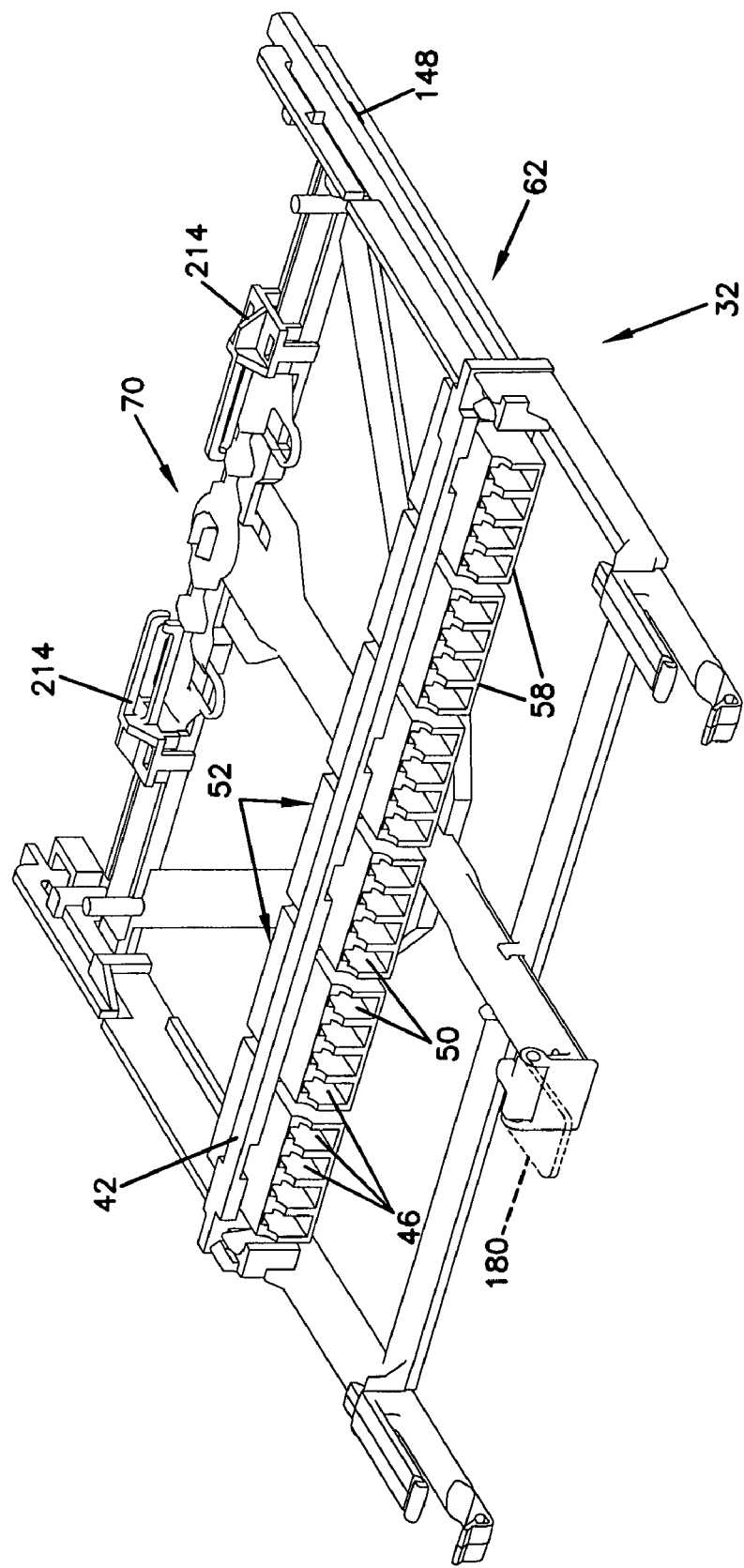
FIG. 5 is a front perspective view of a sliding adapter pack of the adapter panel of FIG. 1, shown in isolation.

Referring now to FIGS. 4 and 5, the adapters 46 of the adapter blocks 58 each includes a front connection end 50 and a rear connection end 52. When mounted to the face panel 42, the front connection ends 50 of the adapters 46 face toward the front opening 28 of the chassis 12, and the rear connection ends 52 of the adapters 46 face toward the rear wall 20 of the chassis 12. The front connection ends 50 of the adapters 46 define open frontward cable connection locations 54 (FIG. 4) of the adapter field 44. The rear connection ends 52 of the adapters 46 define open rearward cable connection locations 56.

What is meant by "open cable connection locations" in this embodiment is that the locations are provided in an open region within the chassis 12, as opposed to a connection location that is enclosed within a housing or module, and the housing or module in turn being mounted within the chassis. While all the adapter packs 32 are enclosed within the chassis 12, the frontward and rearward cable connection locations 54, 56 of the adapter packs 32 are not individually enclosed from one another (i.e., each adapter array 48 is not enclosed separately from other adapter arrays of other packs 32 within the same chassis).

Figure 3:
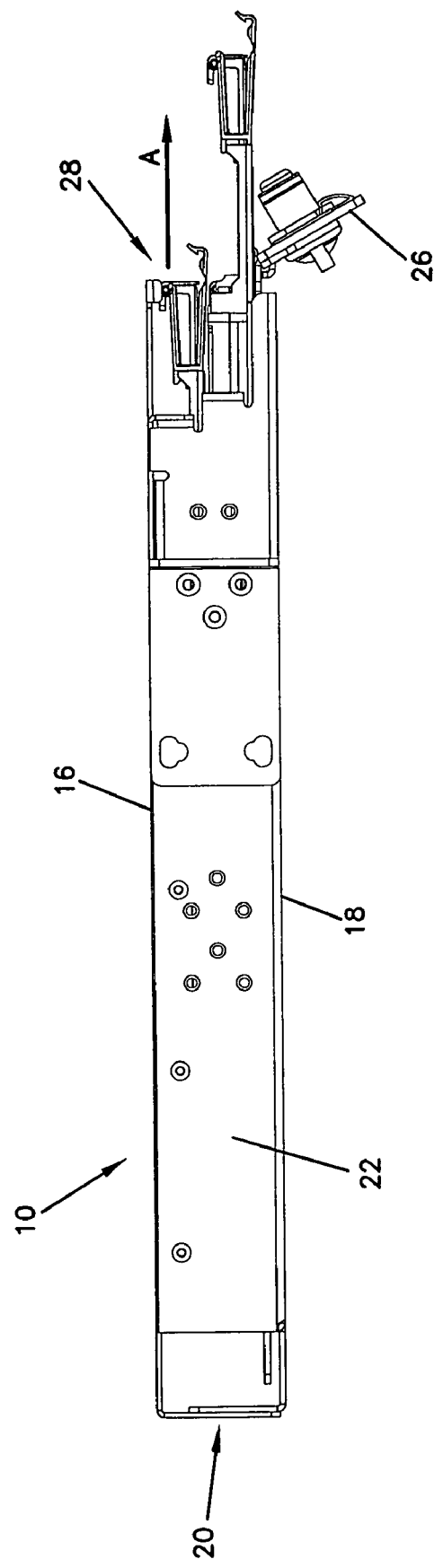
FIG. 3 is a side elevation view of the adapter panel of FIG. 2.

The front adapter field 44 of the adapter panel 10 illustrated in FIG. 4 is defined by four sliding adapter packs 32—two adapter packs positioned side-by-side, and stacked two high. Other numbers of side-by-side and stacked packs can be provided to accommodate the desired front adapter filed configuration. Each adapter pack 32 contains six blocks 58 having four adapters 46 for a total of 96 frontward connection locations 54 and rearward connection locations 56. Each adapter pack 32 is designed to selectively slide in a forward, lateral direction A (see FIGS. 2 and 3) independent of the other packs. The forward, lateral direction A is a direction extending between the front opening 28 and the rear wall 20, as opposed to a direction which is transverse to the bottom wall 18 of the chassis 12, for example.

Figure 6:
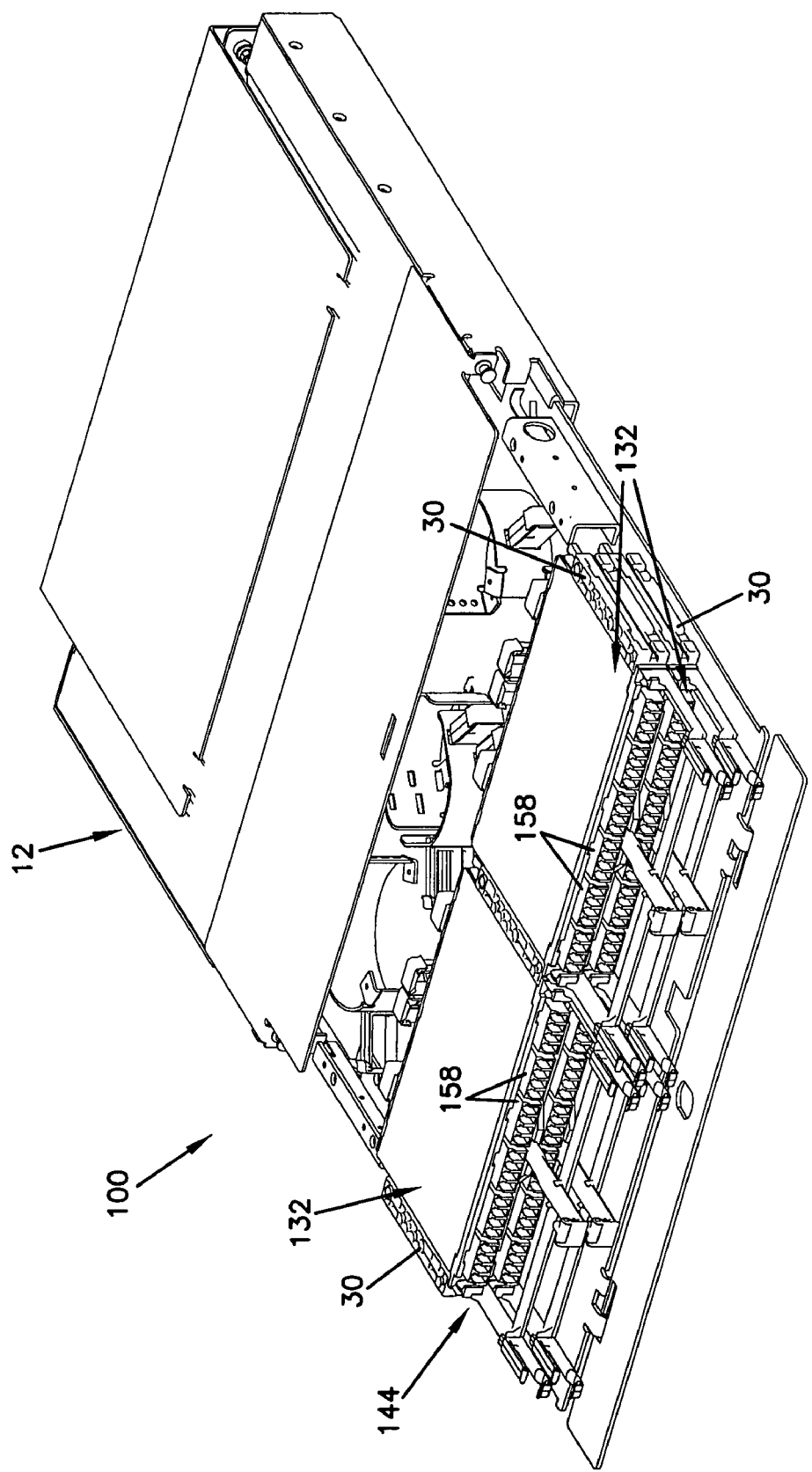
FIG. 6 is a front perspective view of another adapter panel, in accordance with the principles disclosed, and shown with a drawer in an open position.

Referring now to FIG. 6, an alternative adapter panel (e.g., arrangement or assembly) 100 is illustrated. Similar to the previous adapter panel, the adapter panel 100 is designed to provide a high density of cable terminations, yet facilitate access to the cable terminations during installation and post-installation procedures.

The adapter panel 100 of this embodiment includes the same chassis 12 as previously described. A front adapter field 144 of the adapter panel 100, however, is defined by a plurality of sliding adapter packs 132 having a different configuration than the previously described adapter packs 32.

Figure 7:
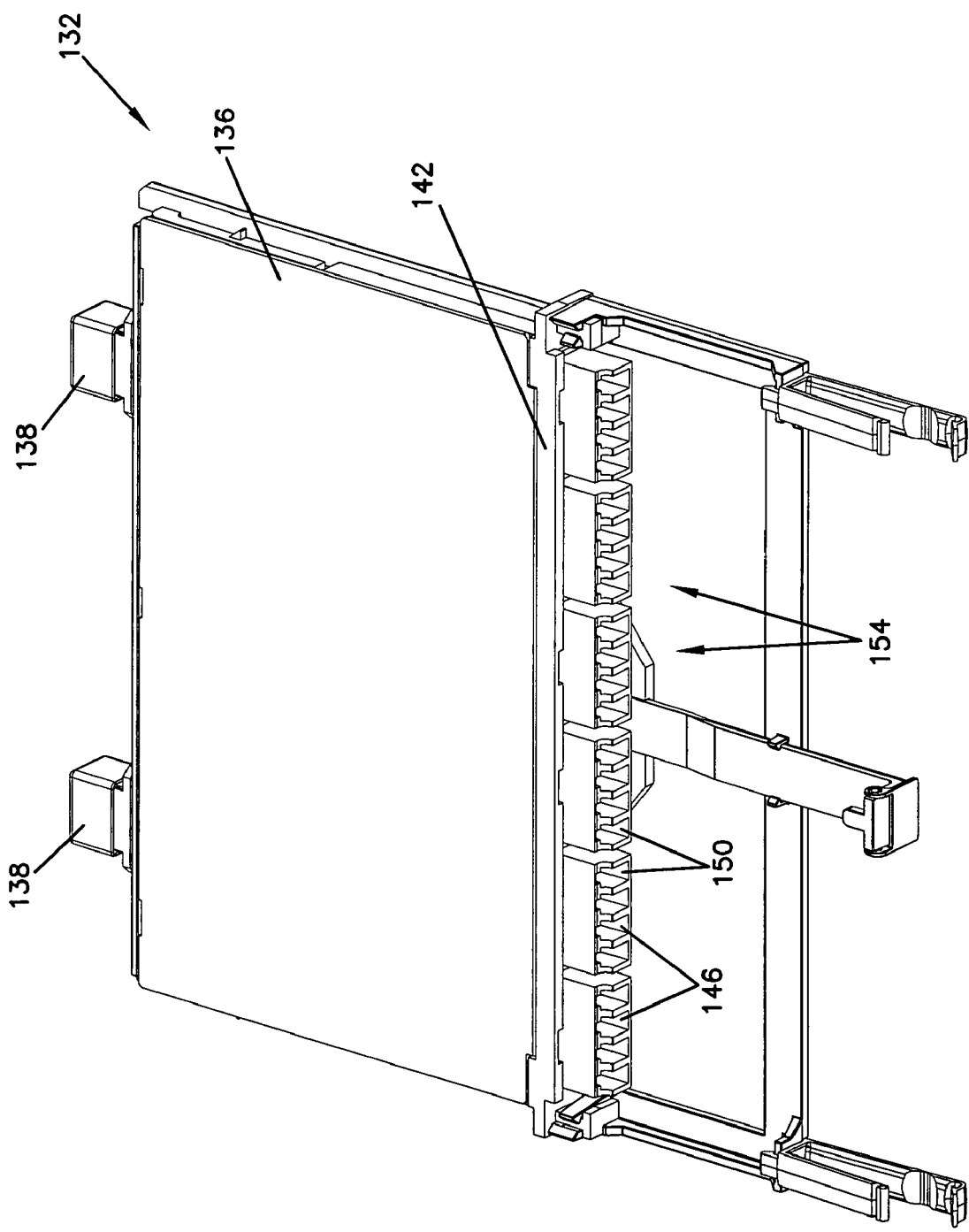
FIG. 7 is a top perspective view of another sliding adapter pack, shown in isolation, and used in the adapter panel of FIG. 6.
Figure 8:
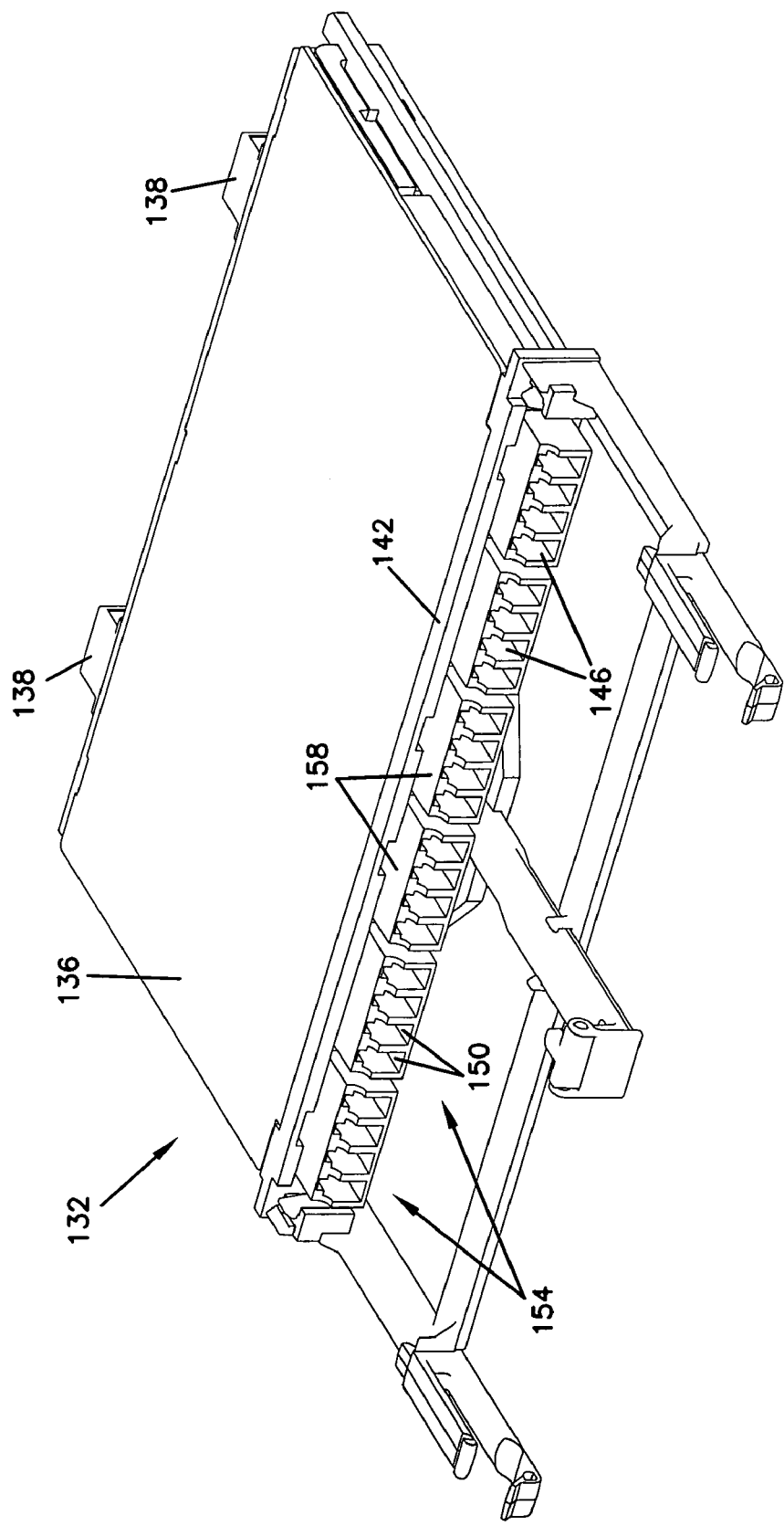
FIG. 8 is a front perspective view of the sliding adapter pack of FIG. 7.
Figure 9:
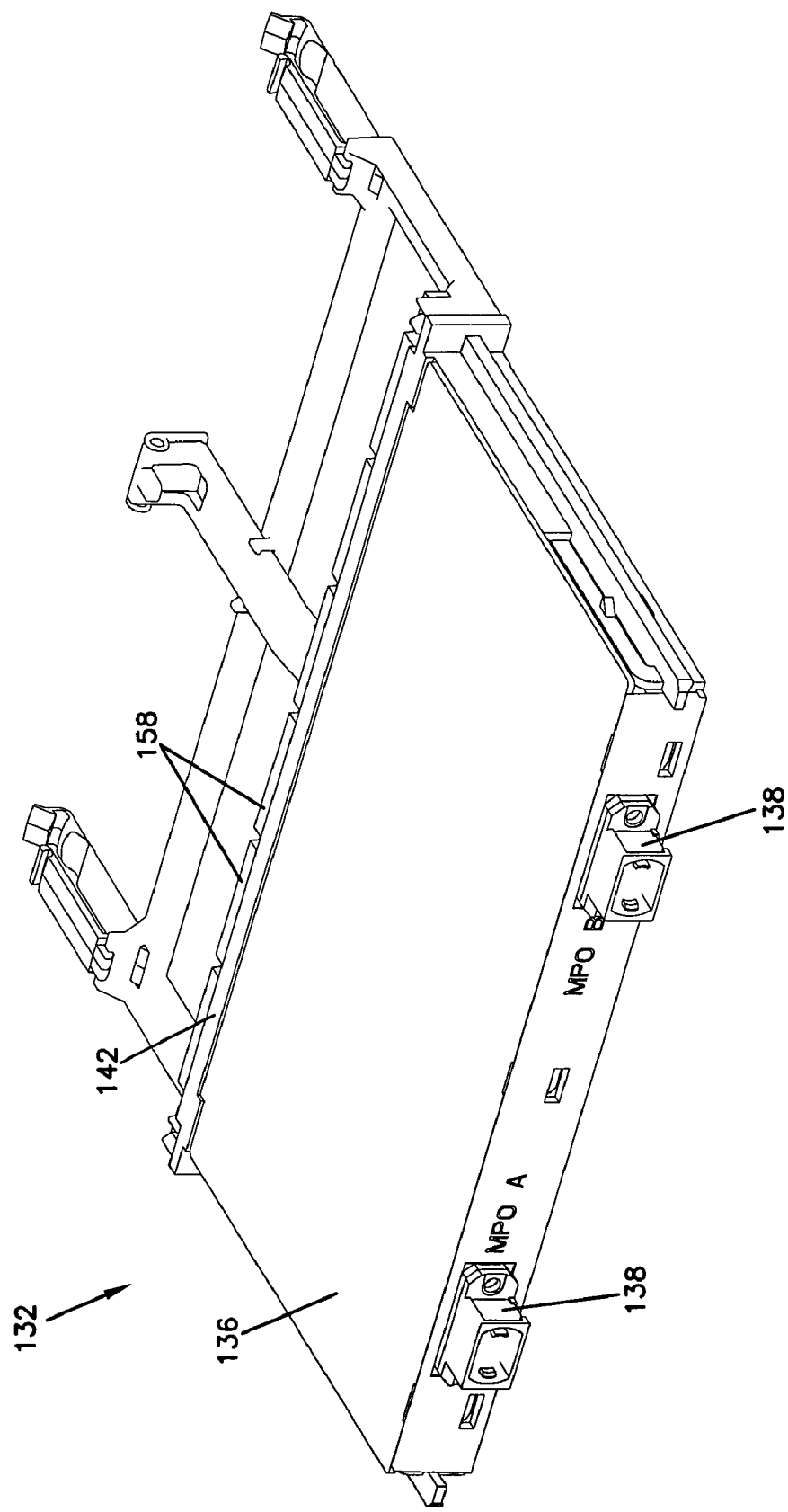
FIG. 9 is a rear perspective view of the sliding adapter pack of FIG. 8.

Referring to FIGS. 7-9, the sliding adapter packs 132 of this embodiment each define an individual face panel 142. Adapters 146 are mounted within openings formed in the face panel 142. The individual face panels 142 of the adapter packs 132 define the front adapter field 144 of the adapter panel 100. The adapters are LC type adapter; however, other types of adapters, such as SC, ST, FC and MPO type adapters can also be used in accordance with the principles disclosed.

The adapters 146 include a front connection end 150 and a rear connection end (not shown). In this embodiment, the front connection ends 150 of the adapters 146 define open frontward cable connection locations 154 of the adapter field 144. The rear connection ends of the adapters 146 are enclosed within a housing 136 (e.g., enclosure, module, cassette). The rear connection ends of the adapters 146 (not shown) are interconnected to connectors 138 located at the rear of the housing 136. In the illustrated embodiment, the rear housing connectors 138 are MPO type connectors; however, other types of connectors, can also be used in accordance with the principles disclosed.

The front adapter field 144 of the adapter panel 100 illustrated in FIG. 6 is defined by four sliding adapter packs 132—two adapter packs positioned side-by-side, and stacked two high. Each adapter pack 132 contains six blocks 158 having four adapters 146. As described with respect to the previous embodiment, each adapter pack 132 is designed to selectively slide in a forward, lateral direction independent of the other packs.

Each of the sliding adapter pack embodiments 32, 132 previously described utilizes the mounting guides 30 (FIGS. 4 and 6) to provide access to the open frontward connection locations 54, 154 of the adapter field 44, 144. In particular, each sliding adapter pack 32, 132 has a frame assembly 62 (FIG. 10) that slidably mounts to the mounting guides 30. In the illustrated embodiments, each sliding adapter pack 32, 132 utilizes the same frame assembly 62 so that the adapter panel 10, 100 can be easily modified to meet the user's requirements, without having to manufacture different mounting components. While a primary portion of the below description of the frame assembly 62 and mounting guides 30 refers to the first embodiment of the sliding adapter pack 32, it is to be understood that the features of the frame assembly 62 and mounting guides 30 also relate to the sliding adapter pack 132 having the housing 136.

Figure 10:
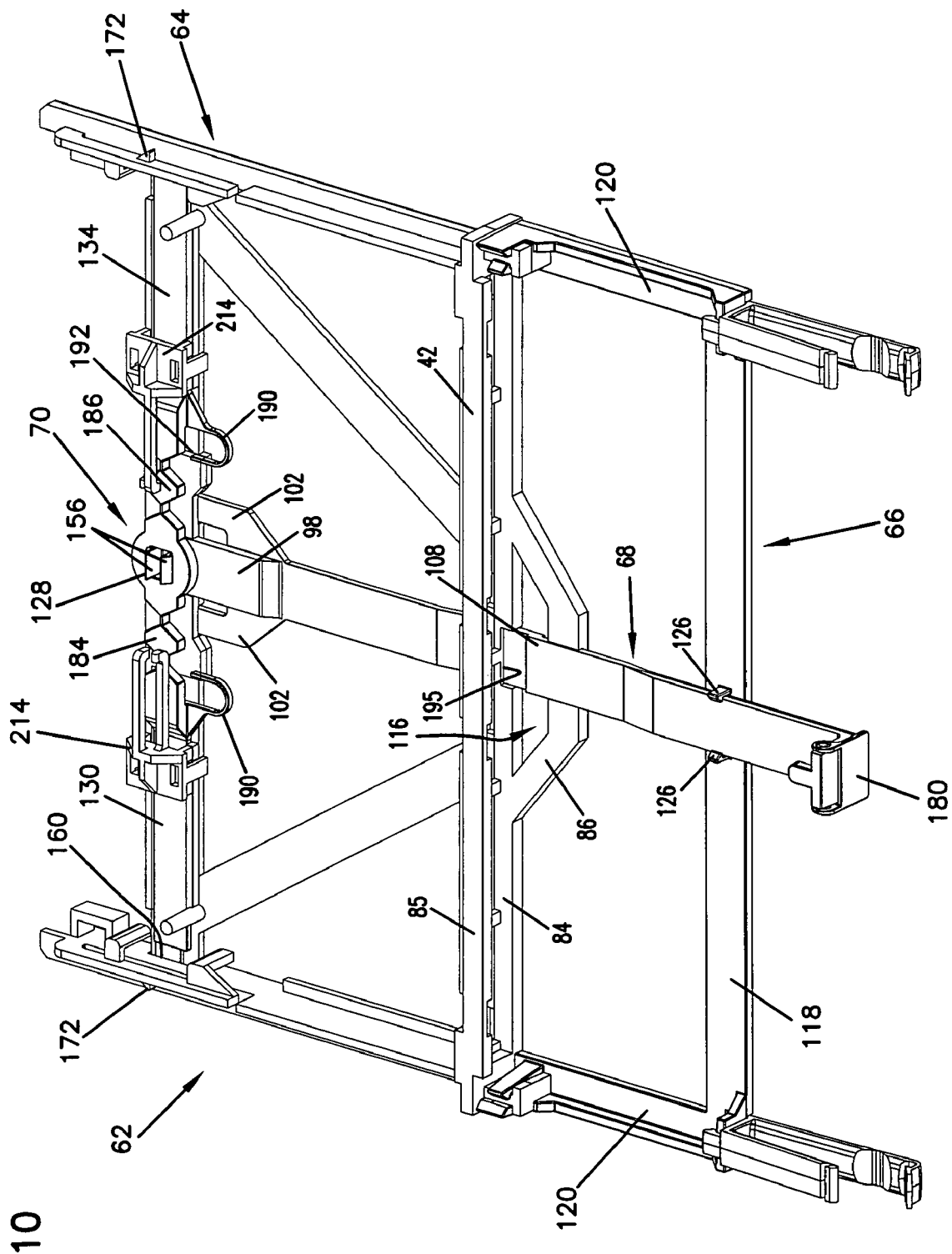
FIG. 10 is a top perspective view of a frame assembly used in both the sliding adapter packs of FIG. 5 and FIG. 7.

Referring now to FIG. 10, the frame assembly 62 generally includes a first frame piece 64, a second frame piece 66, a handle or lever arm 68, and a living hinge 70 (e.g., a hinging member). Each of the components (e.g., 64, 66, 68, 70) of the frame assembly 62 is designed to fit and interconnect to one another without the use of separate fasteners and without the use of tools. This reduces the amount of time, and associated costs, required to construct the frame assembly.

For example, when assembling or constructing the frame assembly 62, the lever arm 68 is first positioned or woven onto the first frame piece 64, and the living hinge 70 is then snap-fit to the lever arm 68. The second frame piece is snap-fit to both the first frame piece 64 and the lever arm 68. As will be understood, there is no particular order as to when the second frame piece is required to be snap-fit to the first frame piece and the lever arm 68 (e.g., the second frame piece may be secured before or after securing the lever to the first frame piece and/or before or after securing the living hinge to the lever arm). Each of these assembly steps is described in further detail below.

Figure 11:
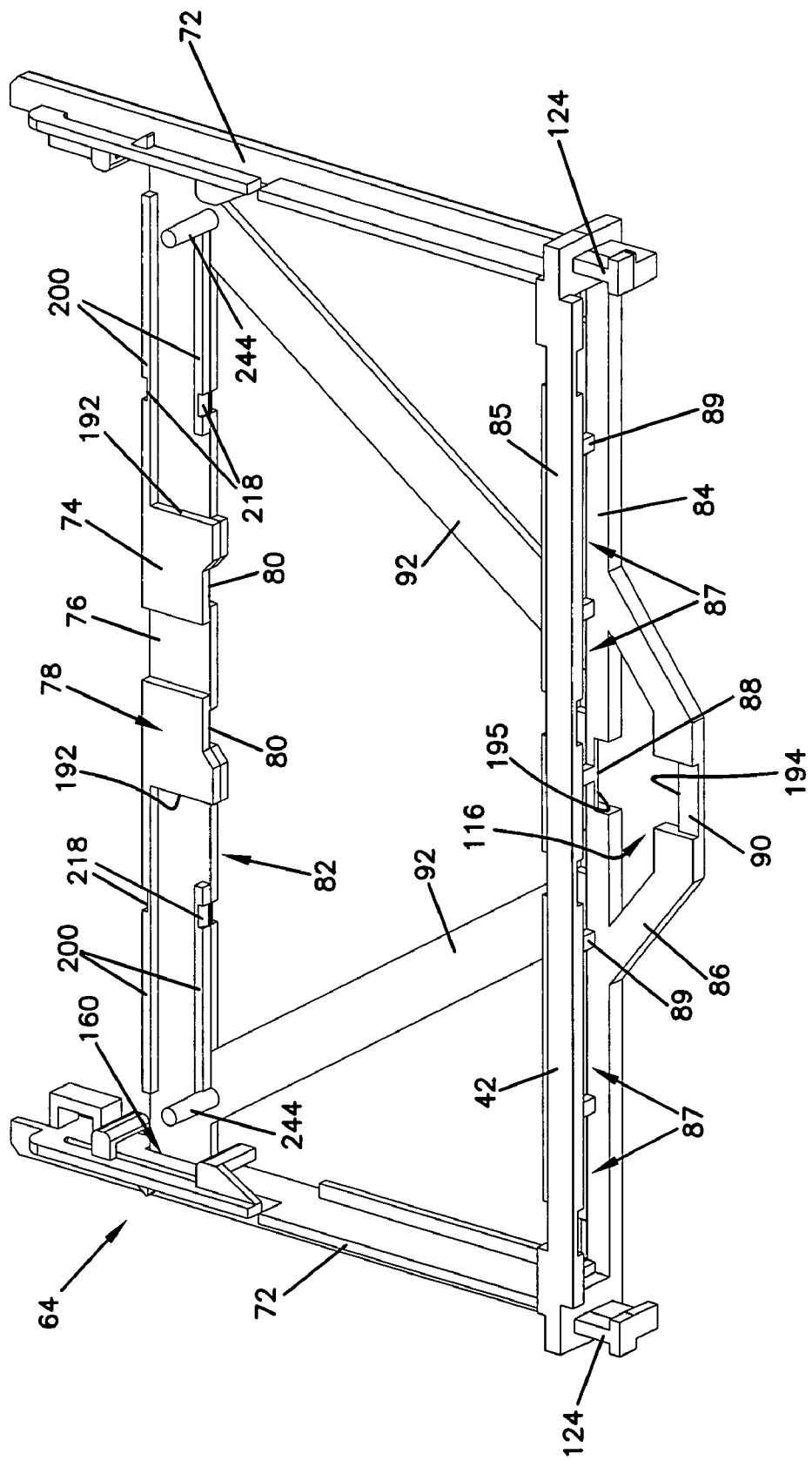
FIG. 11 is a front perspective view of a first frame piece of the frame assembly of FIG. 10, shown in isolation.
Figure 12:
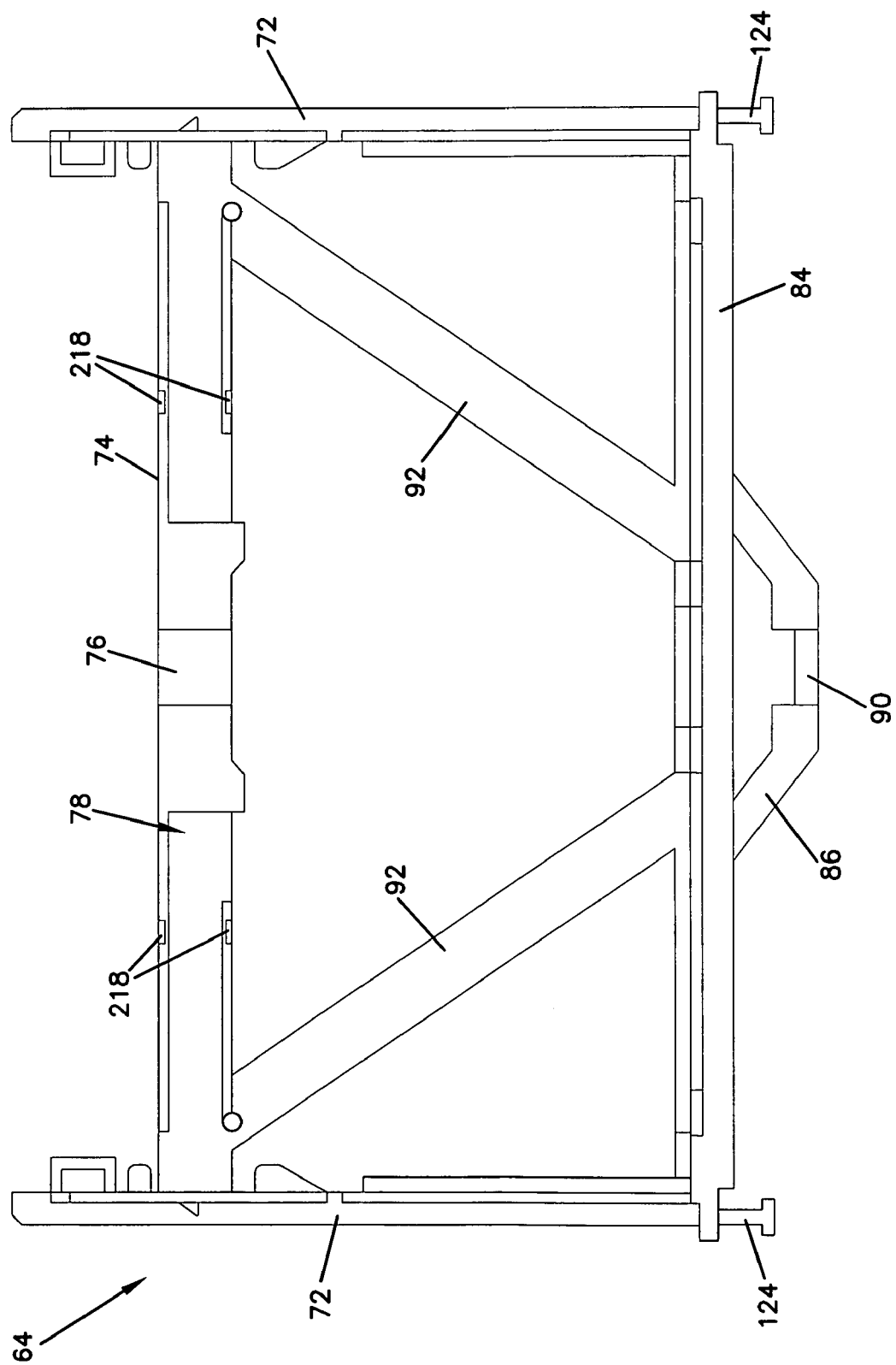
FIG. 12 is a top plan view of the first frame piece of FIG. 11.

Referring to FIGS. 11 and 12, the first frame piece 64 includes elongated rail members 72 and a rearward cross member 74 that extends between the elongated rail members 72. The cross member 74 has a double-sided recess arrangement including a first or central recess 76 formed on a first side or surface 78 of the cross member 74, and second or lateral recesses 80 formed on a second side or surface 82 of the cross member.

The first frame piece 64 further includes first and second forward cross members 84, 85 that extend between the elongated rail members 72. The first and second forward cross members 84, 85 generally define the face panel 42 of the sliding adapter pack 32. In particular, the forward cross members 84, 85 are spaced apart and include dividers 89 to define the openings 87 which receive the adapter blocks 58.

A central bracket 86 projects forward from the first forward cross member 84. A first recessed notch 88 is formed in the first forward cross member 84 and a second recessed notch 90 is formed in the central bracket 86. The first frame piece 64 can also include cross-supports 92 to maintain the structural relationship of the rail members 72 and the frontward and rearward cross members 84, 85, 74.

Figure 13:
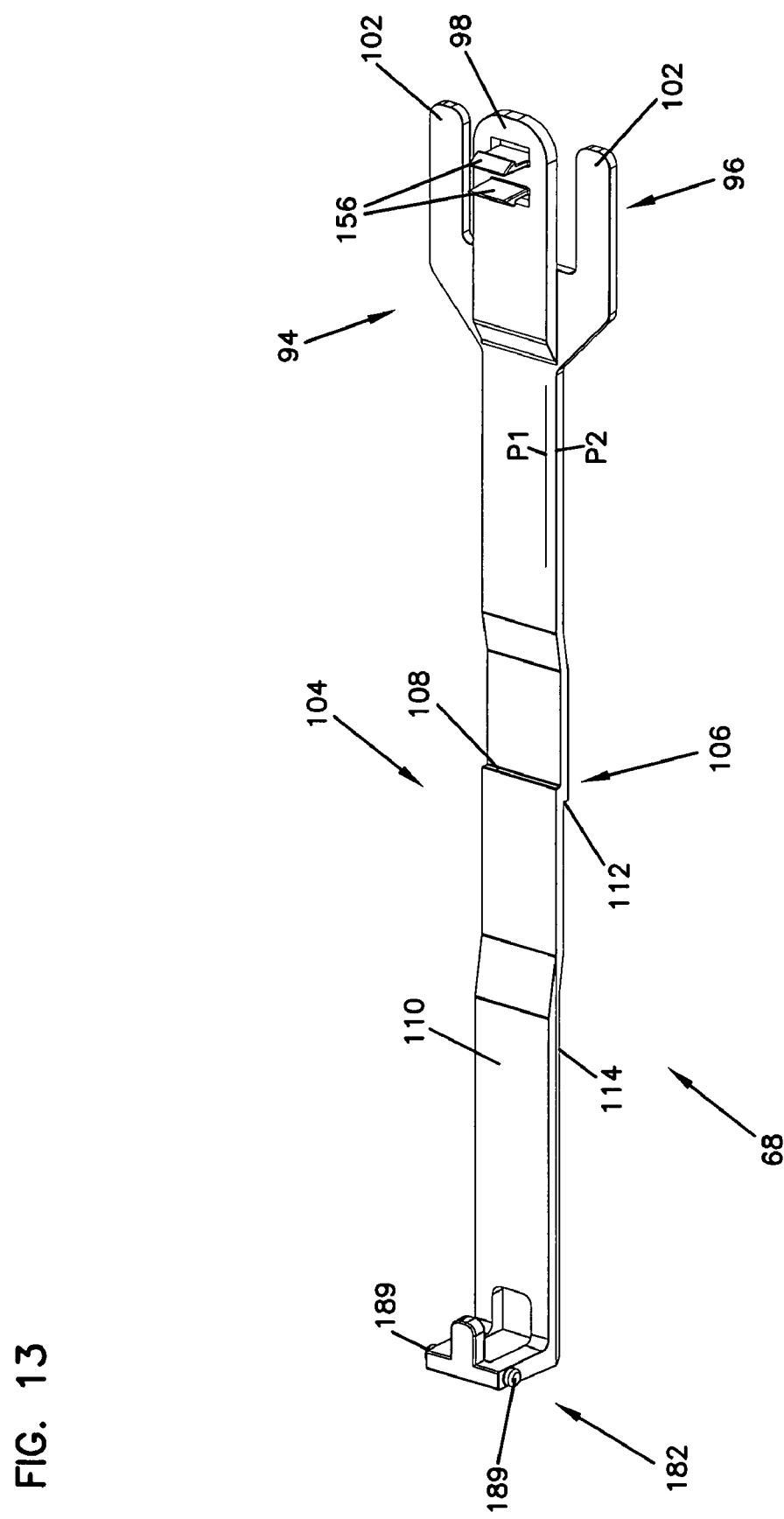
FIG. 13 is a side perspective view of a lever arm of the frame assembly of FIG. 10, shown in isolation.

Referring now to FIG. 13, the lever arm 68 of the frame assembly 62 includes an attachment head 94 located at a first end 96 of the lever arm 68. The attachment head 94 includes a central portion 98 and first and second prongs 102 spaced from and located at the sides of the central portion 98. The central portion 98 is located along a plane P1 that is offset from a plane P2 in which the first and second prongs 102 are located. The lever arm 68 also has a middle portion 104 that defines an offset region 106. A first shoulder 108 is formed at the offset region 106 on a first side 110 of the lever arm 68, and a second shoulder 112 is formed at the offset region on a second opposite side 114 of the lever arm.

When assembling the frame assembly 62, and referring to FIG. 10, the attachment head 94 of the lever arm 68 is inserted through an opening 116 defined between the bracket 86 and the first forward cross member 84. The lever arm 68 then slides into position such that the rearward cross member 74 (FIG. 11) is woven between the prongs 102 and the central portion 98 of the attachment head 94 (see also FIG. 20). That is, central portion 98 of the attachment head 94 is positioned within the top central recess 76 (FIG. 11) of the rearward cross member 74 and the prongs 102 are positioned within the bottom lateral recesses 80. In addition, the middle portion 104 (FIG. 13) of the lever arm 68 weaves under the first forward cross member 84 and over the bracket 86 such that the bracket is received within the offset region 106 (FIG. 13) of the lever arm 68.

Figure 14:
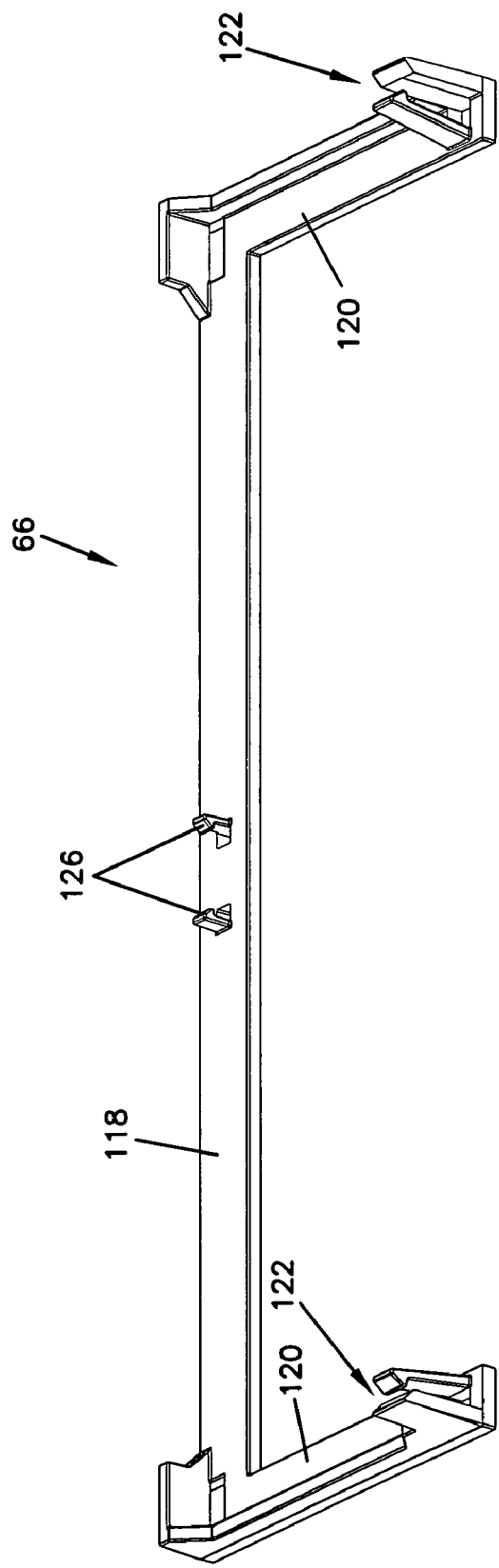
FIG. 14 is a rear perspective view of the a second frame piece of the frame assembly of FIG. 10, shown in isolation.

Referring now to FIGS. 10 and 14, the second frame piece 66 attaches to the both the first frame piece 64 and the lever arm 68. The second frame piece 66 generally has a central frame member 118 and two transverse side members 120. Each of the transverse side members 120 has a set of flexible arms 122 that receive extensions 124 (FIGS. 11 and 12) provided on the first frame piece 64. The arms 122 and extensions 124 of the frame pieces 66, 64 provide a snap-fit connection that secures the first and second frame pieces relative to one another (see FIG. 10) without additional fasteners and without the use of tools.

In addition, the central frame member 118 of the second frame piece 66 includes flexible tabs or elements 126 that receive the middle portion 104 of the lever arm 68. The elements 126 flex away from one another when the lever arm is pressed downward into the region between the elements 126; thereby providing a snap-fit connection.

Referring to FIG. 10, the elements 126 are arranged to retain the lever arm 68 (i.e., prevent upward separation) and to also permit the lever arm to slide in a forward-rearward direction. The sliding movement of the lever arm 68 is limited however by the shoulders 108, 112 (FIG. 13) formed in the offset region 106 of the lever arm 68. As will be discussed in further detail hereinafter, this arrangement in turn limits the motion of the living hinge 70 to prevent the living hinge from over-flexing.

Once the attachment head 94 of the lever arm 68 is woven through the opening 116 of the first frame piece 64, the living hinge 70 can be attached to the lever arm 68. The living hinge 70 generally defines an activation arrangement that is activated by movement of the lever arm 68.

Figure 15:
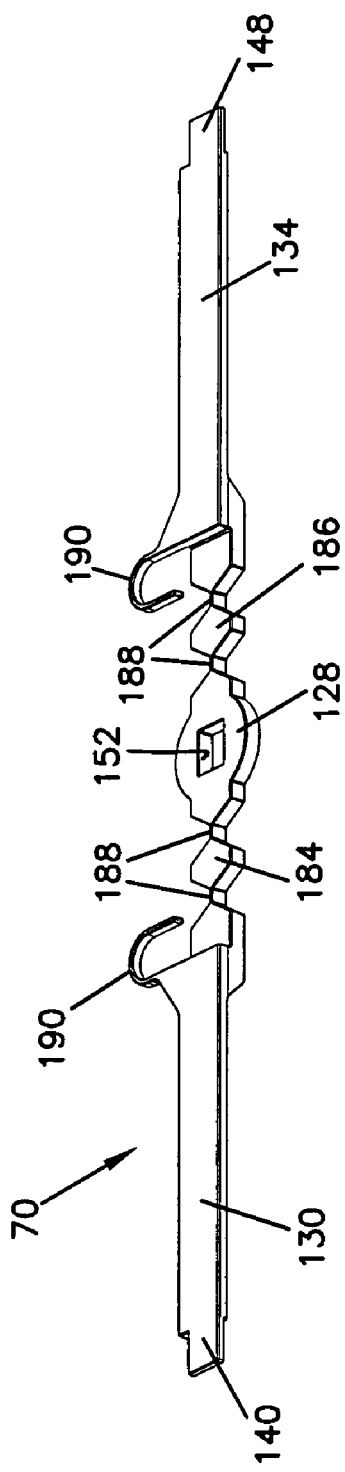
FIG. 15 is a perspective view of the bottom side of a living hinge of the frame assembly of FIG. 10, shown in isolation.
Figure 16:
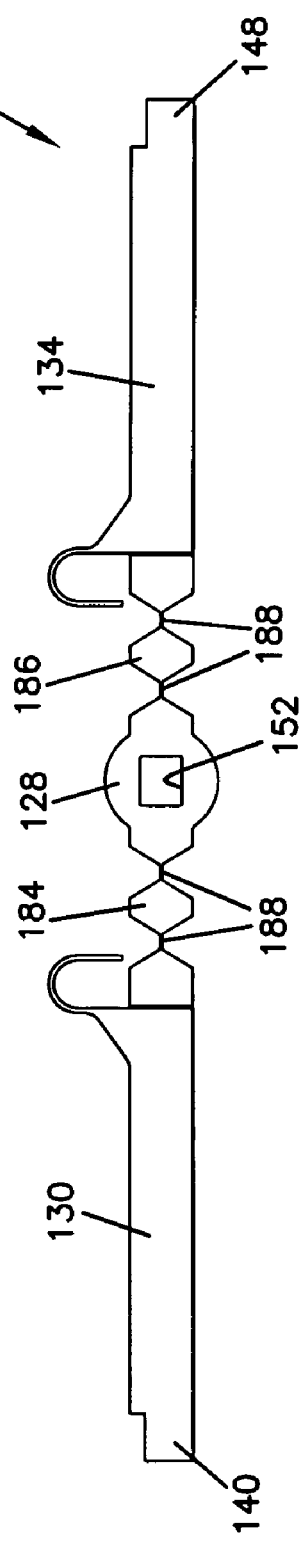
FIG. 16 is a bottom plan view of the living hinge of FIG. 15.

Referring now to FIGS. 10, 15, and 16, the activation arrangement/living hinge 70 includes a central hub 128 and first and second arms 130, 134 that are interconnected to the central hub 128. The central hub 128 defines an aperture 152 sized to receive snap-fit elements 156 (FIG. 13) formed on the central portion 98 of the lever arm 68. Outer ends (e.g., 140, 148) of the arms 130, 134 are positioned through slots 160 (FIG. 10) formed in the elongated rail members 72 of the first frame piece 64.

Figure 17:
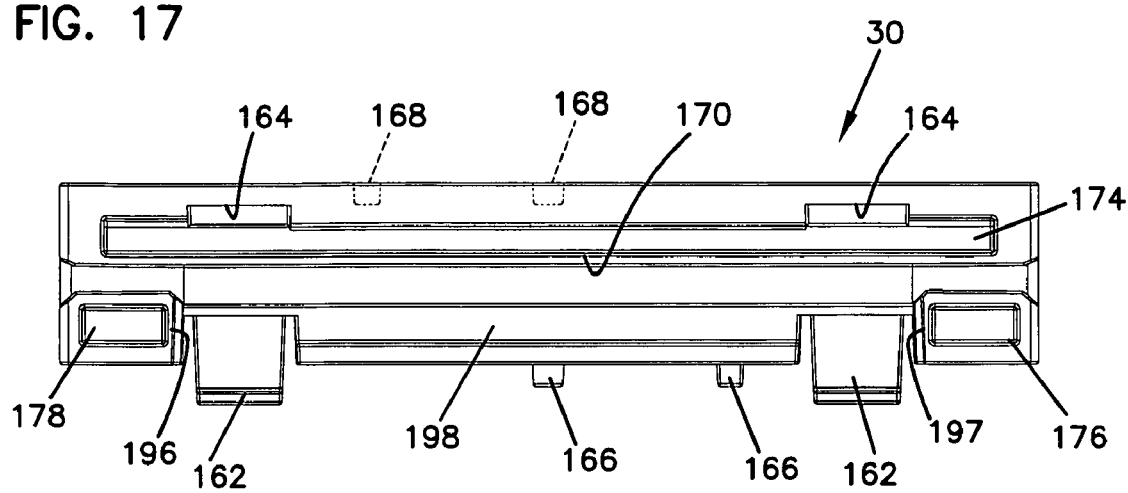
FIG. 17 is a side elevation view of a mounting guide of the adapter panels of FIGS. 1 and 6, shown in isolation.
Figure 18:
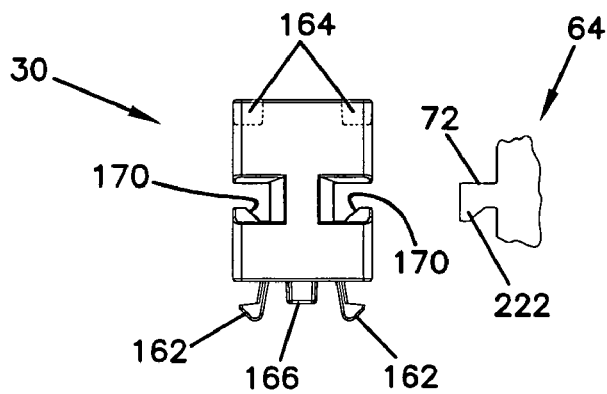
FIG. 18 is a front elevation view of the mounting guide of FIG. 17.
Figure 19:
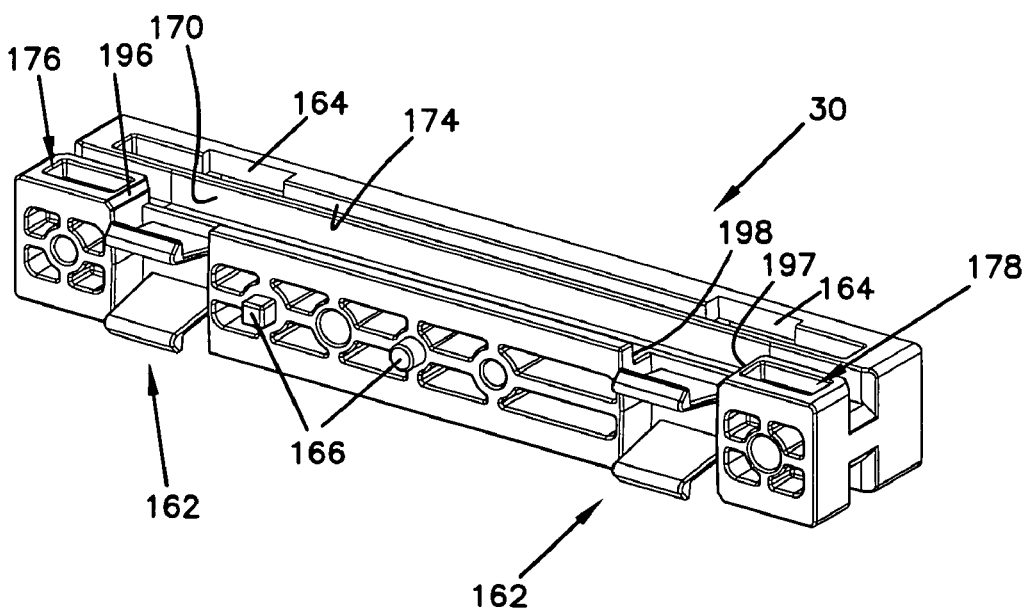
FIG. 19 is a bottom perspective view of the mounting guide of FIG. 17.

Referring now to FIGS. 10 and 17-18, the pair of elongated rail members 72 of the first frame piece 64 are arranged to engage and slide within pairs of mounting guides 30 (one shown in FIGS. 17-18). As previously described, the mounting guides 30 are secure to the drawer 34 of the adapter panel 10 (FIG. 4). To reduce assembly time and associated costs, the mounting guides 30 each include a pair of flexible feet 162 (FIG. 19) that provide a snap-fit connection to secure the guides 30 to corresponding holes (not shown) formed in the drawer; thereby eliminating the need for separate fasteners and tools. Referring to FIGS. 18 and 19, each mounting guide 30 further includes corresponding structure 164 (e.g., slots, apertures) sized to receive the feet 162 from another mounting guide so that the guides 30 can be snap-fit to one another in a stacked relationship (as shown in FIG. 4). Alignment pegs 166 and corresponding apertures 168 (FIG. 17) can be provided to aid in properly orienting and aligning the mounting guides relative to one another. In an alternative embodiment, the guides 30 may utilize fasteners or screws to secure the guides in a stacked relationship.

Referring now to FIG. 18, as can be understood, the elongated rail members 72 of the frame assembly 62 slide within corresponding rail grooves 170 formed in the mounting guides 30. Referring to FIG. 10, each of the elongated rail members 72 further includes a stop 172. The stops rides within another groove 174 (FIG. 17) formed in the mounting guides 30. The groove 174 that receives the stop 172 has closed ends that limit the travel of the frame assembly 62 relative to the fixed mounting guides 30. The stop 172 and closed-end groove 174 prevent the frame assembly 62 from separating from the mounting guide 30 in both a forward direction and a rearward direction.

Figure 20:
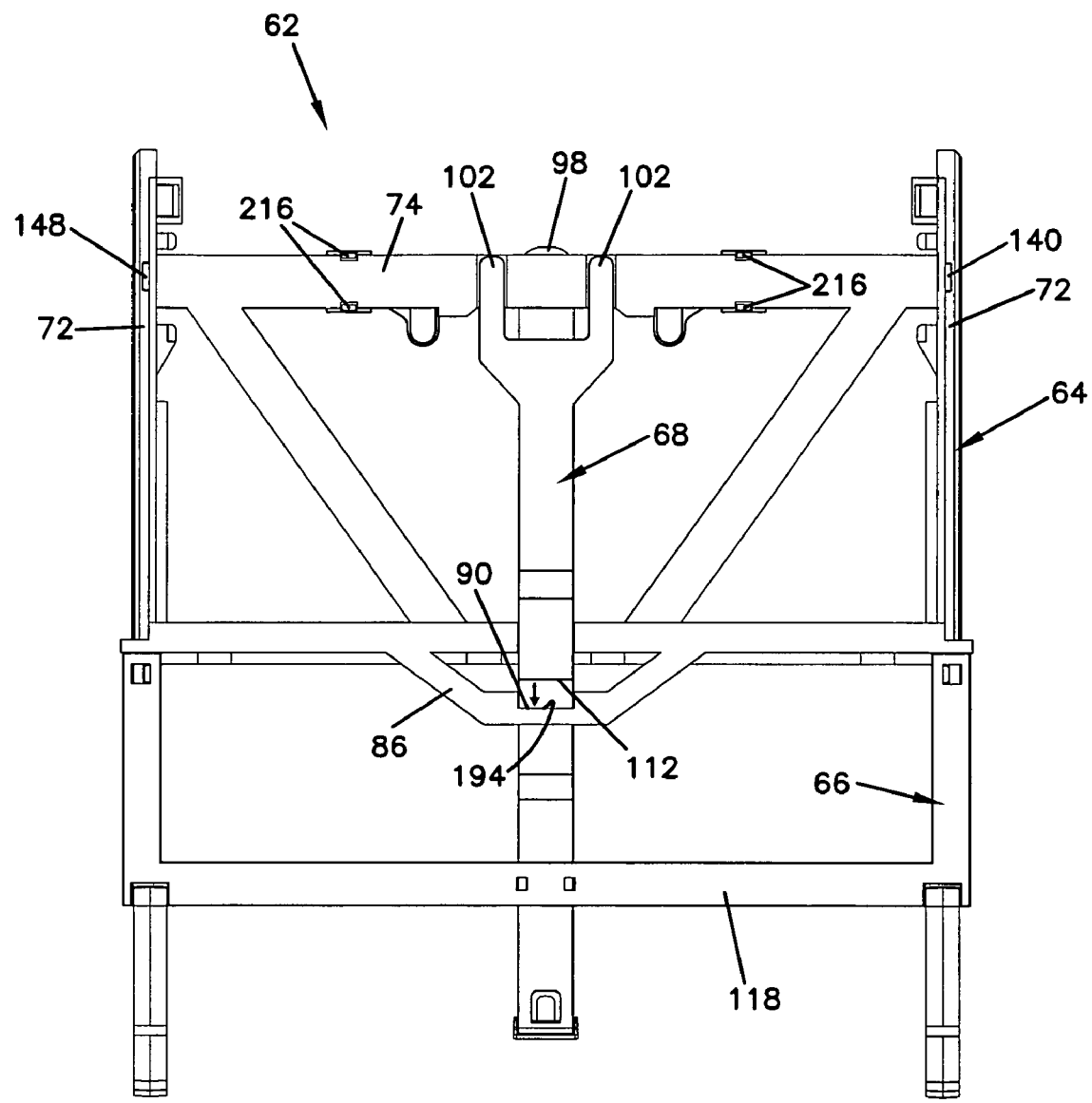
FIG. 20 is a bottom plan view of the frame assembly of FIG. 10.

Referring to FIG. 20, the outer ends (e.g., 140, 148) of the hinge 70 extend through the slots 160 formed in the elongated members. The outer ends of the first and second arms 130, 134 (FIGS. 15 and 16) define locking tabs 140, 148 of the frame assembly 62. The locking tabs 140, 148 engage the mounting guides 30 to lock the sliding adapter pack 32 into a selected one of both a forward position and a rearward position.

In particular, and with reference to FIGS. 17 and 19, the mounting guides 30 include locking apertures or slots 176, 178 each sized to receive the locking tabs (e.g., 140). When the sliding adapter pack 32 is positioned in the rearward position (see FIG. 4), the locking tab 140 is seated within the rearward slot 176 of the mounting guide 30. When the sliding adapter pack 32 is positioned in the forward position (see FIG. 2 showing one pack 32 in the forward position), the locking tab 140 is seated within the forward slot 178 of the mounting guide 30. In the illustrated embodiment, there is a lateral sliding distance of about 3.0 inches between the rearward position and the forward position.

To move the sliding adapter packs 32 between the rearward and forward positions, a user simply pulls or pushes the lever arm 68 of the frame assembly 62. As shown in FIG. 10, the frame assembly 62 includes a handle portion 180 that attaches to pins 189 (FIG. 13) located at a second end 182 of the lever arm 68. In the illustrated embodiment, the handle portion 180 pivots on the pins 189 of the lever arm 68 so as to provide an extending tab (see FIG. 5) that is easy to grasp when sliding the adapter pack 32, yet utilizes minimal space when not in use.

In use, pulling or pushing the lever arm 68 activates the living hinge 70. That is, components of the frame assembly 62 are "activated" or in movement (causing the locking tabs 140, 148 disengage from the mounting guides 30) prior to sliding movement of the sliding adapter pack 32. In particular, the living hinge 70 is flexibly constructed so that when the lever arm 68 is pulled or pushed, the locking tabs 140, 148 un-seat from the slots (e.g. 176) and slide within the grooves 170 of the mounting guides 30. As will be understood, the lever arm 68 initially moves or slides relative to the frame pieces 64, 66, and prior to sliding movement of the adapter pack 32. This initial movement of the lever arm 68 is part of the "activation;" the other part being the movement of the arms of the living hinge 70 when disengaging from the mounting guides.

Referring back to FIGS. 10 and 15, the living hinge 70 includes first and second linking elements 184, 186 that interconnect the central hub 128 to each of the arms 130, 134 by way of thin, flexible webs 188. When the lever arm 68 is pulled in the forward direction, for example, the central hub 128 is also pulled in the forward direction; the arms 130, 134, however, are constrained by sidewalls 200 (FIG. 11) of the first frame piece 64, and further captured within the slots 160 of the first frame piece 64 and within the rearward slots 176 of the fixed mounting guides 30.

Figure 21:
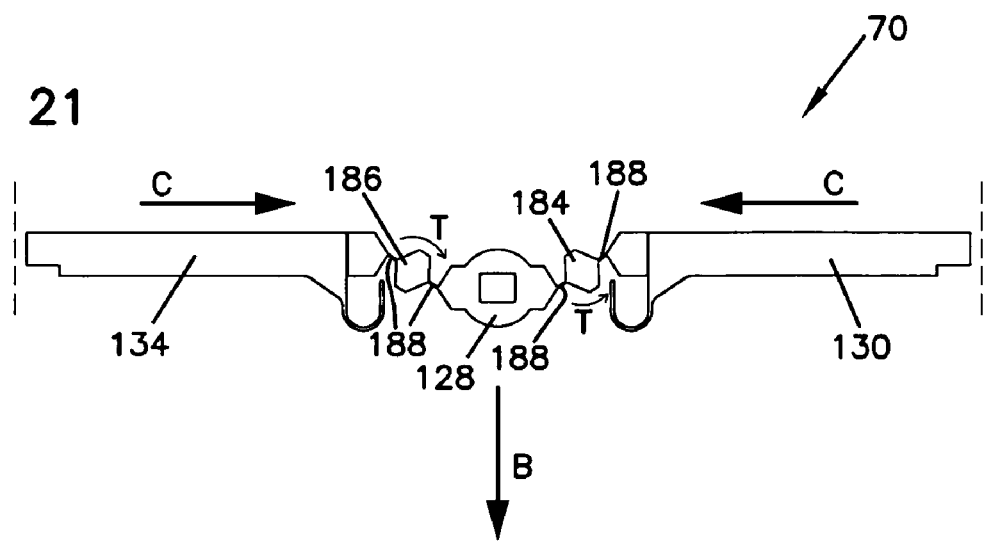
FIG. 21 is a bottom plan view of the living hinge of FIG. 16, shown in an activated or unlocking position.

Referring to FIG. 21, the flexible webs 188 of the living hinge 70 permit the linking elements 184, 186 to twist, as represented by arrows T. In particular, when the central hub 128 is pulled in the forward direction, as shown by arrow B, the first linking element 184 twists in a counter-clockwise direction and the second linking element 186 twists in a clockwise direction. The twisting motion allows the central hub 128 to travel linearly in the forward direction (represented by arrow B) and also permits the constrained arms 130, 134 to travel linearly in a direction perpendicular (represented by arrows C) to the movement of the central hub (i.e., the arms travel toward one another).

Likewise, when the central hub 128 is pushed in the rearward direction, the first and second linking elements 184, 186 twist in opposite directions such that the central hub 128 travels linearly in the rearward direction. The opposite twisting motion of the linking elements 184, 186 similarly permit the arms 130, 134 to travel linearly in a direction perpendicular to the movement of the central hub. When the sliding adapter pack 32 is oriented horizontally within the chassis 12, the forward and rearward movement of the central hub 128 lay in a first horizontal plane that is parallel to a second horizontal plane in which the arms 130, 134 move.

As can be understood, the lever arm 68 activates the living hinge 70 when the lever arm is both pulled and pushed. The design of the living hinge 70 is advantageous in that only a single, integral, molded piece provides all the activation action and motion necessary to disengage the locking tabs 140, 148 from the mounting guides 30. In the illustrated embodiment, the living hinge 70 is constructed so that the central hub 128 travels the same amount of distance in both the forward and rearward directions. In both circumstances, the movement of the central hub 128 and the linking elements 184, 186 cause the arms 130, 134 to move and the locking tabs 140, 148 to disengage from the locking slots 176, 178 of the mounting guides 30.

Referring again to FIGS. 10 and 15, the living hinge 70 further includes biasing members or spring elements 190 that bias the locking tabs 140, 148 in a lateral direction away from one another. The biasing members 190 are attached to the arms 130, 134 of the living hinge 70. When assembled, the biasing members 190 contact shoulders 192 (see also FIG. 11) formed in the rearward cross member 74 of the first frame piece 64. When the lever arm 68 is pushed or pulled and the locking tabs 140, 148 disengaged, the biasing members 190 are compressed to provide an outward biasing force opposite the travel direction of the arms 130, 134. The biasing force functions to seat the locking tabs 140, 148 of the living hinge 70 within the slots 176, 178 of the mounting guides 30 when the sliding adapter pack reaches the selected forward or rearward position.

As previously described, the adapter panel 10 is designed such that the drawer 34 is intended to slide only during installation procedures, as opposed to during post-installation or operative use. Referring to FIG. 4, during installation, cables 202, such as fiber optic cables, are routed into the chassis 12 through rear openings 40 and terminated to either the open rearward connection locations 56 of the face panel 42 or to connectors that in turn terminate to the open rearward connection locations 56.

Figure 22:
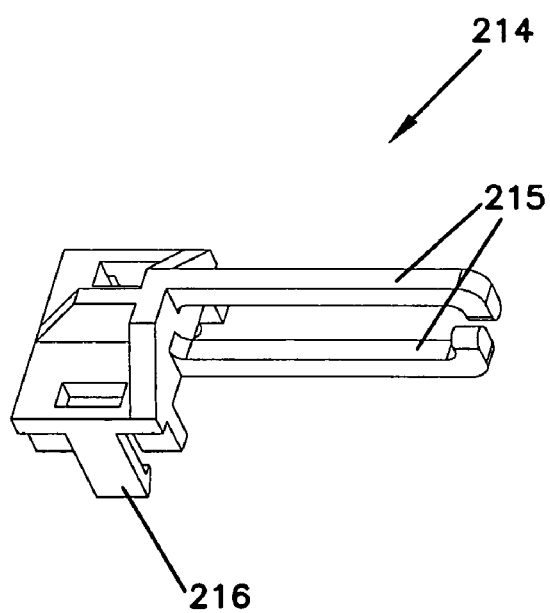
FIG. 22 is a top perspective view of a retainer of the frame assembly of FIG. 10, shown in isolation.

In the first sliding adapter pack embodiment 32, snap-on cable guides or retainers 214 (FIGS. 10 and 21) are fitted to the frame assembly 62. The retainers 214 have fingers 215 (FIG. 21) that retain and guide cables routed toward the open rearward connection locations 56. The snap-on cable guides 214 have flexible elements 216 (FIGS. 22 and 20) that snap-fit to notches 218 (FIG. 12) formed in the rearward cross member 74 of the first frame piece 64. In addition, posts 244 (FIG. 11) positioned on the first frame piece of the frame assembly 62 aid in preventing cables from becoming inadvertently pinched in the slots 160 during actuation of the living hinge 70 or sliding movement of the adapter pack 32. The posts 244 of the frame assembly 62 further aid in aligning the housing 136 (FIG. 8) in applications utilizing the adapter pack 132 with rear connectors 138. (As can be understood, the retainers 214 are not fitted to the frame assembly 62 when the housing 136 is instead provided.)

Referring again to FIG. 4, to allow further access to the adapters 46 of the adapter pack 32 during installation, the top wall 16 of the chassis 12 includes a front removable access panel 206. A rear removable access panel 208 can also be provided to aid in routing cables from the rear of the chassis 12 toward the sliding adapter packs 32.

The fiber optic cables 202 typically have a predetermined length that can be routed about cable storage spools or structures (e.g., 204). The predetermined lengths of the cables, however, do not have enough slack to accommodate drawer 34 movement during operative use, and the adapter panel 10 does not have devices such as sliding radius limiters that take up or manage excessive movement of cable slack. In the present adapter panels, the predetermined lengths of the cables generally accommodate only the limited sliding movement of the sliding adapter packs 32. That is, while the drawer 34 may be slid out for purposes of installation, or for repairs requiring access to the region behind the adapter packs 32, the drawer 34 is not intended to slide for purposes of accessing the adapter packs 32 during operative use of the adapter panel 10. Operative use and access to the adapter packs 32 is instead provided by the sliding movement of the packs 32 relative to, and without, the sliding movement of the drawer 34.

Referring to FIG. 2, jumper cables or patching cables 210 are also terminated to the adapter packs 32; and in particular, to the open frontward connection locations 54 of the face panels 42. The patching cables 210 provide the cross-connections between the adapter panel 10 and other telecommunications equipment (not shown). The patching cables 210 are routed from the front opening 28 and through side openings 212 (FIG. 1) of the chassis 12 to cable routing structure (e.g., channels, not shown) of the telecommunications system.

Because of the high-density arrangement of the front adapter field 44, each adapter pack 32 slides forward to separate the associated adapter array 48 from the other arrays (see FIG. 2). By separately positioning the adapter packs 32 and the associated adapter array 48 forward, a technician can more easily grasp a particular connector of a terminated patching cable 210, and/or more easily terminate a patching cable to a particular adapter 46 of the forwardly-positioned array. The locking tabs of the adapter pack maintain the adapter pack 32 in the forward position when rearward force is applied while terminating a patching cable to the particular adapters 46 of the adapter pack 32. Likewise, the locking tabs of the adjacent adapter packs 32 maintain those packs in the rearward position, for example, to prevent inadvertent movement of the adjacent packs while the selected pack 32 is being slid forward.

Referring back to FIG. 2, in use, the sliding adapter packs 32 that define the front adapter field 44 are located within the interior 14 of the chassis. Unless being serviced (e.g., repaired, re-configured, or maintained), the sliding adapter packs 32 are enclosed within the interior 14 of the chassis and locked in the rearward position. That is, the locking tabs of the sliding adapter packs 32 are engaged within the rearward slots 176 (FIG. 17) of the mounting guides 30. To service the adapter panel, the user simply grasps the handle portion 180 of a selected sliding adapter pack 32 and pulls forward. Pulling the handle portion 180 (i.e., lever arm 68) activates the living hinge 70, as previously described.

The linear forward motion of the living hinge 70 is limited by the arrangement of the frame assembly 62. In particular, and referring to FIG. 20, the shoulder 112 of the lever arm 68 catches or stops at an edge 194 of the recessed notch 90 formed in the first frame piece 64 (see also FIG. 11). This not only prevents the webs 188 of the living hinge 70 from over flexing or over stretching, but also functions as the positive engagement that causes the adapter pack 32 to slide in response to the pulling force.

With the living hinge 70 activated (i.e., the locking tabs disengaged from the rearward slot 176 of the mounting guides 30) and the shoulder 112 of the lever arm 68 engaged against the edge 194 of the first frame piece 64, the rail members 72 of the sliding adapter pack slide forward within the grooves 170 of the mounting guides 30. The locking tabs 140, 148 of the living hinge 70 also slide within a cut-out region 198 (FIGS. 17 and 19) of each mounting guide 30 and eventually contact a ramped surface 196 of the guide 30. The ramped surface 196 aids in guiding each locking tabs 140, 148 into the forward slot 178 of the mounting guide 30.

When the locking tabs 140, 148 are seated within the forward slots 178 of the guides, the sliding adapter pack is securely locked within the forward position. The locking tabs prevent inadvertent movement that can cause damage to cables during service of the adapter panel. For example, the locking tabs 140, 148 maintain the adapter pack 32 in the forward position (see FIG. 2) when rearward force is applied while inserting plugs/connectors into the adapters 46 of the adapter pack 32.

After service is complete, the user pushes the handle portion 180 or lever arm 68 rearward to return the sliding adapter pack to the rearward position. Pushing the lever arm 68 activates the living hinge 70, as previously described.

Similar to the forward motion, the linear rearward motion of the living hinge 70 is limited by the arrangement of the frame assembly 62. In particular, and referring to FIG. 10, the shoulder 108 of the lever arm 68 catches or stops at an edge 195 of the recessed notch 88 formed in the first frame piece 64 (see also FIG. 11). This not only prevents the webs 188 of the living hinge 70 from over flexing or over stretching, but also functions as the positive engagement that causes the adapter pack 32 to slide in response to the pushing force.

With the living hinge 70 again activated (i.e., the locking tabs disengaged from the forward slot 178 of the mounting guides 30) and the shoulder 108 of the lever arm 68 engaged against the edge 195 of the first frame piece 64, the rail members 72 of the sliding adapter pack slide rearward within the grooves 170 of the mounting guides 30. The locking tabs 140, 148 of the living hinge 70 also slide within the cut-out region 198 (FIGS. 17 and 19) of each mounting guide 30 and eventually contact another ramped surface 197 of the guide 30. The ramped surface 197 aids in guiding each locking tabs 140, 148 into the rearward slot 176 of the mounting guide 30.

When the locking tabs 140, 148 are seated within the rearward slots 176 of the guides, the sliding adapter pack is securely locked within the rearward position. The locking tabs prevent inadvertent movement that can cause damage to cables during service of the adapter panel. For instance, the locking tabs 140, 148 maintain the adapter pack 32 in the rearward position when an adjacent sliding pack is pulled forward for service.

Figure 23:
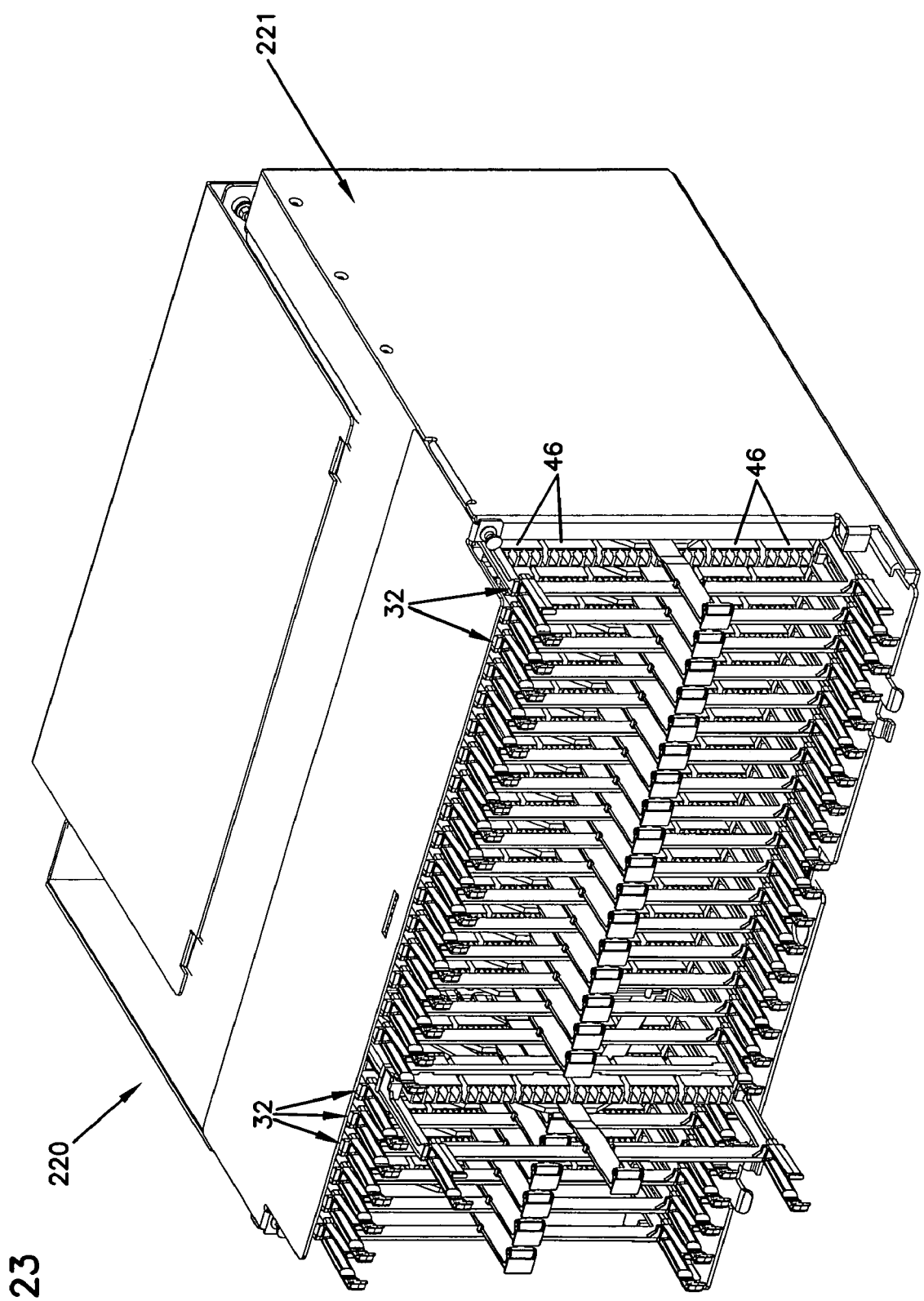
FIG. 23 is front perspective view of yet another embodiment of an adapter panel, in accordance with the principles disclosed, shown with sliding adapter packs mounted in a vertical orientation.
Figure 24:
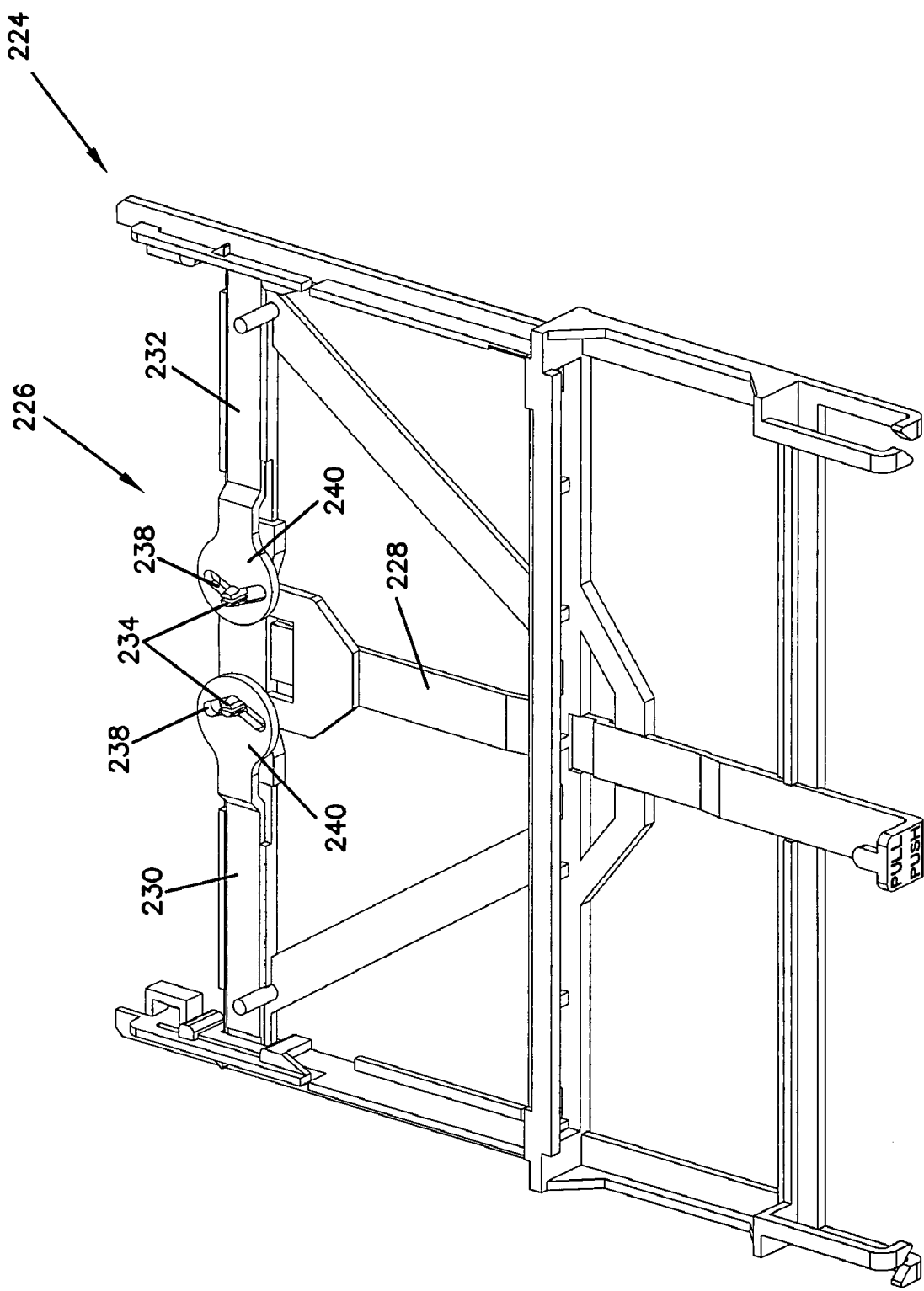
FIG. 24 is a front perspective view of another embodiment of a frame assembly that can be used with the sliding adapter packs disclosed.

Referring now to FIG. 23, yet another embodiment of an adapter panel 220 is illustrated. In this embodiment, the sliding adapter packs 32 of FIG. 5 are mounted in a chassis 221 in a vertical orientation. In the vertical orientation, the face panel of each sliding adapter pack 32 defines a single column of adapters 46. The frame assembly 62 (FIG. 20) of the sliding adapter packs 32 is particularly adapted to permit the vertical orientation mounting. Specifically, and referring back to FIG. 18, each of the rail members 72 of the first frame piece 64 has a nose or hook 222 that secures the rail member 72 within the groove 170 of the mounting guides 30 when the guides and adapter packs 32 are oriented 90 degrees relative to horizontal. As can be understood, the features and operation of the previously described embodiments apply similarly to the adapter panel 220 shown in FIG. 23.

Figure 25:
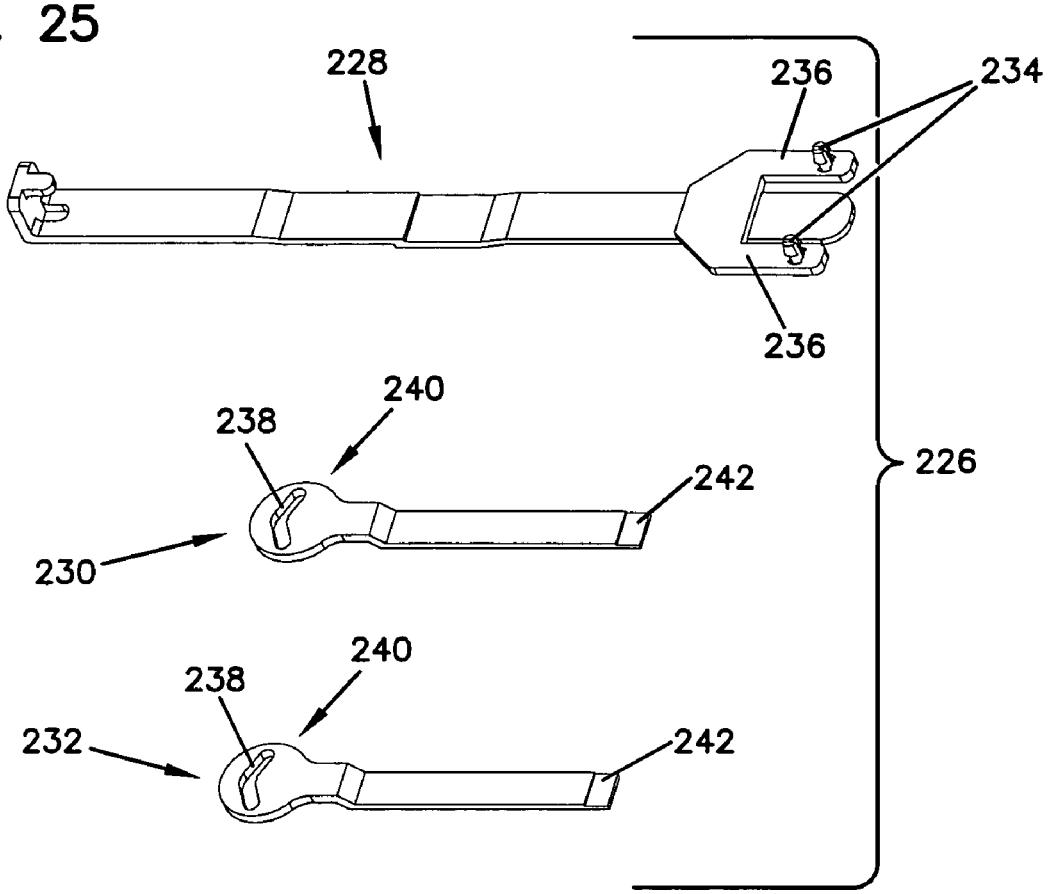
FIG. 25 is a perspective view of a lever and transverse arms of the frame assembly of FIG. 24.

Referring now to FIGS. 24-27, an alternative embodiment of a frame assembly 224 is illustrated. The frame assembly 224 is similar to the previous embodiment, the primary difference being the actuation arrangement 226. In this embodiment, the actuation arrangement 226 includes a lever 228 that is pushed or pulled to disengage two separate arms 230, 232 from the slots (e.g., 176, 178) of the mounting guides 30. Each of the arms 230, 232 is attached to a peg 234 (see also FIG. 25) formed on a lateral prong 236 of the lever 228. The pegs 234 are received within an angled or arcuate slot 238 formed in one end 240 of the arms 230, 232. The peg and slot arrangement is designed to secure the arms 230, 232 relative to the lever 228 (i.e. to prevent separation), yet still allow the pegs 234 to ride within the slots 238. Referring to FIG. 25, opposite the one end 240 defining the slot 238 of each arm 230, 232 is another end that defines a locking tab 242 that engages the mounting guides 30, as previously described.

Figure 26:
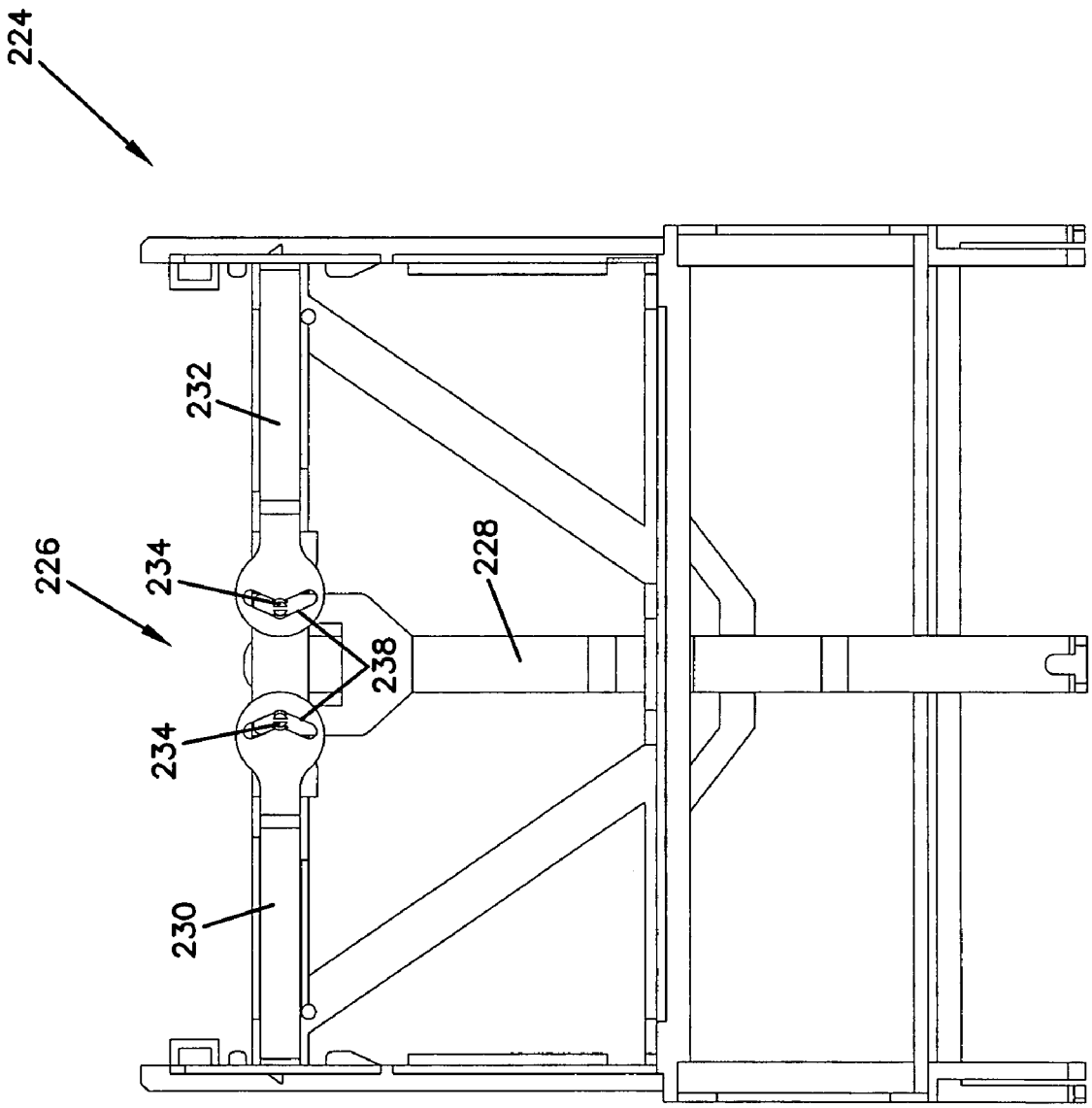
FIG. 26 is a top plan view of the frame assembly of FIG. 24, shown in a locking position.
Figure 27:
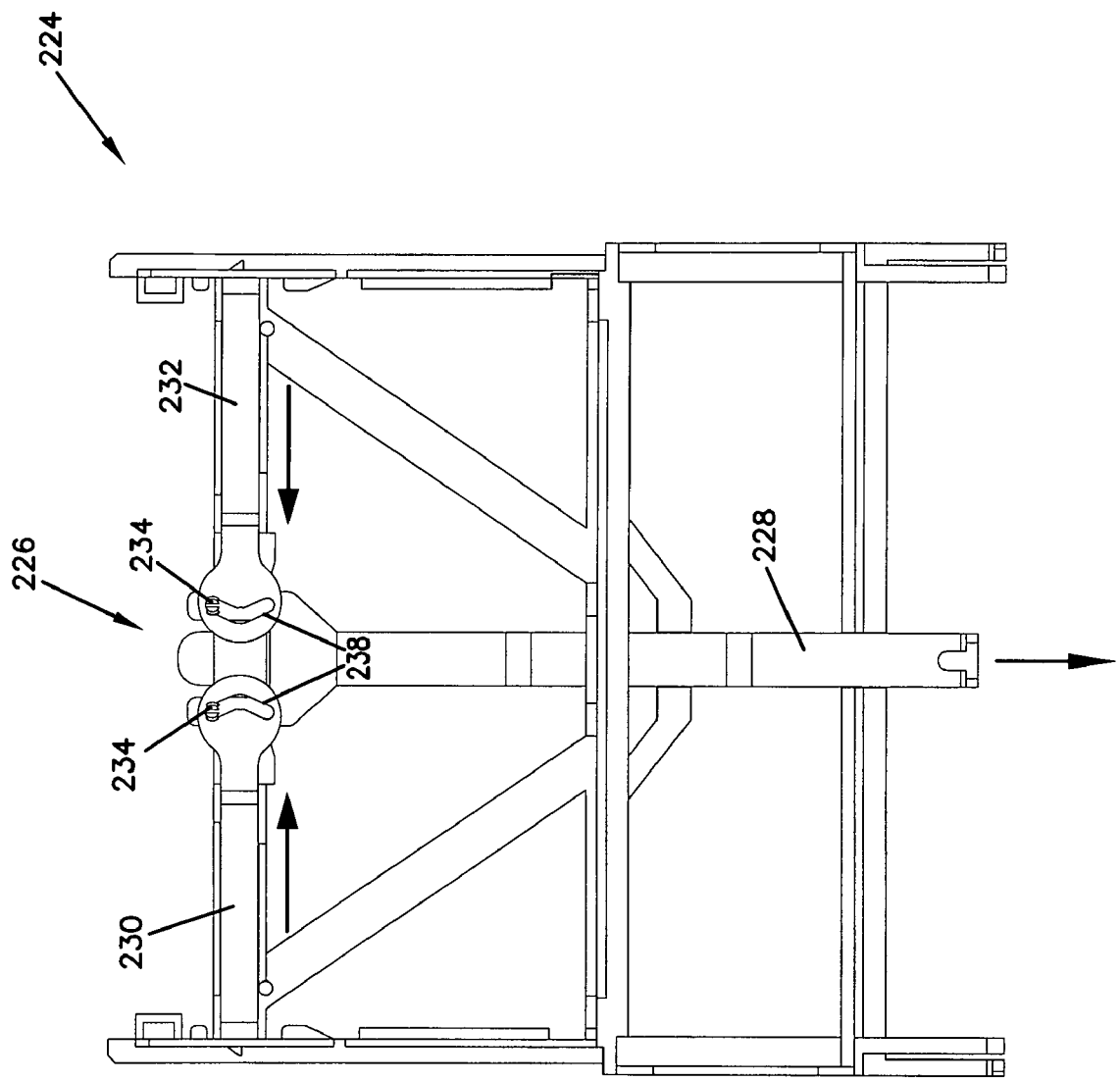
FIG. 27 is a top plan view of the frame assembly of FIG. 24, shown in an unlocking position.

Referring to FIG. 26, when the locking tabs 242 of the arms 230, 232 are engaged within the slots (e.g., 176, FIG. 17) of the mounting guides 30, the pegs 234 of the lever 228 are centrally located within the slots 238 of the arms. Referring to FIG. 27, when the lever 228 is moved (pulled, for example), the pegs 234 slide within the angled or arcuate slots 238. In turn, the arms 230, 232 move linearly toward one another, causing the locking tabs 242 to disengage from the mounting guides. When the pegs 234 reach the end of the slots 238, the linear movement of the arms stop and the sliding adapter pack is then pulled to the forward position. As can be understood, the actuation arrangement 226 operates in a similar manner when the sliding adapter pack is pushed from the forward position to the rearward position. Further, in accordance with the principles disclosed, the other features and advantages previously described with respect to the other embodiments, apply similarly to the frame assembly 224 of FIGS. 24-27, and any adapter panel utilizing the frame assembly 224.

While the present disclosure is described with respect to use of adapter panels in fiber optic applications, the disclosed arrangements can be adapted for use in other applications. For example, in some applications, copper cables may be used exclusively from fiber optic cables; and accordingly various types of wire terminations or wire connectors can be provided on the face panel of the arrangement. Still, in other applications having hybrid cabling, or applications having both types of fiber optic and copper cabling, the face panel of the arrangement can be provided with a combination of fiber optic and copper connectors and/or adapters.

In general, the present adapter panels provides a high-density adapter panel arrangement while facilitating access to otherwise crowded front connection locations. Because of the access design of the present arrangement, the amount of space utilized on racks and cabinets is minimized; or, in the alternative, allows for expansion and upgrade of systems having spatial constraints, as more densely packed connection locations are provided without sacrificing effective access to the connection locations.

The above specification provides a complete description of the present invention. Since many embodiments of the invention can be made without departing from the spirit and scope of the invention, certain aspects of the invention reside in the claims hereinafter appended.

What is claimed is:

1. An adapter panel, comprising:
  a) a chassis defining an interior, the chassis having a front opening;
  b) mounting guides located within the interior of the chassis; and
  c) a plurality of sliding adapter packs mounted to the mounting guides, the plurality of sliding adapter packs each being configured to slide independent of one another between a forward position and a rearward position, and between the rearward position and the forward position, the plurality of sliding adapter packs each defining a face panel including an array of adapters, and the plurality of sliding adapter packs each including a hinging member and a handle;
    i) each hinging member having a locking tab that engages one of the mounting guides to lock the respective sliding adapter pack of the plurality of sliding adapter packs into a selected position chosen from the respective forward position and the respective rearward position; and
    ii) each handle when pushed or pulled activating the respective hinging member to disengage the respective locking tab from the respective one of the mounting guides to allow sliding movement away from the selected position.

2. The adapter panel of claim 1, further including a front chassis cover located adjacent to the front opening, the front chassis cover and the chassis enclosing the face panels of the sliding adapter packs when the front chassis cover is closed.

3. The adapter panel of claim 1, wherein each face panel has the respective array of adapters positioned in only one row.

4. The adapter panel of claim 1, wherein each face panel has the respective array of adapters positioned in only one column.

5. The adapter panel of claim 1, wherein the plurality of sliding adapter packs includes at least two sliding adapter packs positioned side-by-side within the interior of the chassis.

6. The adapter panel of claim 5, wherein the plurality of sliding adapter packs includes a number of stacked sliding adapter packs.

7. The adapter panel of claim 1, wherein the plurality of sliding adapter packs each includes a second locking tab, and wherein the plurality of sliding adapter packs each slidably mount to a respective pair of the mounting guides, the one of the mounting guides being one of the respective pair of the mounting guides, and wherein the plurality of sliding adapter packs are each locked into the respective selected position when the respective locking tab and the respective second locking tab cooperate to engage the respective pair of the mounting guides.

8. The adapter panel of claim 7, wherein the plurality of sliding adapter packs each also include a sliding frame assembly, the sliding frame assembly having elongated rail members that slide within the respective pair of the mounting guides.

9. The adapter panel of claim 1, wherein the plurality of sliding adapter packs and the mounting guides are mounted to a drawer that slides relative to the chassis, the plurality of sliding adapter packs being configured to slide independent of the drawer.

10. The adapter panel of claim 1, wherein each locking tab is defined at a first end of the respective hinging member or at a second end of the respective hinging member, and wherein the plurality of sliding adapter packs are each locked into the respective selected position when the respective locking tab engages a corresponding aperture formed in the respective one of the mounting guides.

11. The adapter panel of claim 10, wherein the hinging member of each sliding adapter pack of the plurality of sliding adapter packs has an activation arrangement including a central hub, and first and second arms attached to the central hub, wherein rearward movement of the central hub causes the first and second arms to move along an axis perpendicular to the rearward and forward movement of the central hub and wherein forward movement of the central hub also causes the first and second arms to move along the axis perpendicular to the rearward and forward movement of the central hub.

12. The adapter panel of claim 11, wherein the central hub of each activation arrangement is attached to the respective handle of the respective sliding adapter pack of the plurality of sliding adapter packs, whereby each central hub moves rearward when the respective handle is pushed and each central hub moves forward when the respective handle is pulled.

13. The adapter panel of claim 11, wherein each central hub moves in a first plane that is parallel to a second plane in which the first and second arms move.

14. The adapter panel of claim 11, wherein the each hinging member further includes a first linking element and a second linking element, the first linking element being configured to twist between the central hub and the first arm, the second linking element being configured to twist between the central hub and the second arm, the twisting motion of the first and second linking elements allowing the central hub to travel linearly along a forward/rearward axis and the first and second arms to travel linearly along an axis that is perpendicular to the forward/rearward axis.

15. The adapter panel of claim 14, wherein the central hub of the each sliding adapter pack of the plurality of sliding adapter packs is connected to each of the first and second linking elements by a first flexible web, and the each of the first and second linking elements is connected to a respective one of the first and second arms by a second flexible web.

16. A sliding adapter pack that mounts within a telecommunications chassis and is configured to slide within the telecommunications chassis along a first axis, the sliding adapter pack comprising:
  a) a frame assembly including:
    i) at least one frame piece;
    ii) a lever arm interconnected to the at least one frame piece;
    iii) a living hinge including:
      1) a central hub;
      2) first and second linking elements each interconnected to the central hub by a respective one of first flexible webs; and
      3) first and second arms each interconnected to the first and second linking elements by a respective one of second flexible webs;
    iv) wherein each of the first and second linking elements twist between the central hub and by a respective one of the first and second arms when the lever arm is either pulled or pushed along a first axis, the twisting motion of the first and second linking elements allowing the central hub to travel along the first axis and the first and second arms to travel along a second axis perpendicular to the first axis.

17. The adapter pack of claim 16, wherein the first and second arms of the living hinge define locking tabs that extend and retract to lock the sliding adapter pack in a forward position when the sliding adapter pack has been moved to the forward position relative to the telecommunications chassis and in a rearward position when the sliding adapter pack has been moved to the rearward position relative to the telecommunications chassis.

18. The adapter pack of claim 17, wherein the lever arm activates the living hinge to retract the locking tabs so that the sliding adapter pack can freely slide between the forward and rearward positions.

19. The adapter pack of claim 18, wherein the lever arm activates the living hinge when the lever arm is pulled regardless of whether the sliding adapter pack is in the forward or rearward position and the lever arm activates the living hinge when the lever arm is pushed regardless of whether the sliding adapter pack is in the forward or rearward position.

* * * * *